(12) United States Patent  
Mock

(10) Patent No.: US 8,922,615 B2  
(45) Date of Patent: Dec. 30, 2014

(54) CUSTOMIZING INPUT TO A VIDEOCONFERENCE USING A REMOTE CONTROL DEVICE

(75) Inventor: Wayne E. Mock, Round Rock, TX (US)

(73) Assignee: Logitech Europe S.A., Morges (CH)

( * ) Notice: Subject to any disclaimer, the term of this patent is extended or adjusted under 35 U.S.C. 154(b) by 500 days.

(21) Appl. No.: 13/327,978

(22) Filed: Dec. 16, 2011

(65) Prior Publication Data

US 2013/0155175 A1    Jun. 20, 2013

(51) Int. Cl.  
*H04N 7/14*    (2006.01)

(52) U.S. Cl.  
USPC ............... 348/14.05; 348/14.08; 379/102.03; 379/202.01; 455/556.1

(58) Field of Classification Search  
CPC .. H04B 1/205; H04L 12/2818; H04L 12/282; H04L 67/025; H04N 5/232; H04N 5/4403; H04N 5/44582; H04N 21/42204; H04N 21/42207; H04N 21/42219; H04N 21/42225; H04N 21/42226; H04N 21/42227; H04N 21/42228  
USPC ................. 348/14.01–14.16; 370/259–271, 370/351–357; 455/456.1–575.9, 90.1–90.3; 709/201–207, 217–248  
See application file for complete search history.

(56) References Cited

U.S. PATENT DOCUMENTS

| | | | |
|---|---|---|---|
| 5,386,251 A * | 1/1995 | Movshovich | 348/734 |
| 5,590,831 A * | 1/1997 | Manson et al. | 236/51 |
| 6,133,847 A | 10/2000 | Yang | |
| 6,346,934 B1 * | 2/2002 | Wugofski | 345/158 |
| 6,590,602 B1 * | 7/2003 | Fernandez et al. | 348/14.08 |
| 6,762,773 B2 * | 7/2004 | Kolde et al. | 715/716 |
| 7,006,613 B2 * | 2/2006 | Novak et al. | 379/142.01 |
| 7,233,316 B2 * | 6/2007 | Smith et al. | 345/157 |
| 7,692,683 B2 | 4/2010 | Kenoyer et al. | |
| 7,737,999 B2 * | 6/2010 | Ardhanari et al. | 345/685 |
| 8,237,765 B2 | 8/2012 | King et al. | |
| 8,237,862 B2 * | 8/2012 | Nakamura | 348/552 |
| 8,243,017 B2 * | 8/2012 | Brodersen et al. | 345/158 |
| 8,294,831 B2 * | 10/2012 | Pal | 348/734 |
| 8,456,284 B2 * | 6/2013 | Rigazio et al. | 340/12.5 |
| 2003/0162494 A1 * | 8/2003 | Oosugi | 455/3.06 |

(Continued)

OTHER PUBLICATIONS

U.S. Appl. No. 13/171,292, filed Jun. 28, 2011, inventor Wayne E. Mock.

(Continued)

*Primary Examiner* — Hemant Patel  
(74) *Attorney, Agent, or Firm* — Meyertons Hood Kivlin Kowert & Goetzel, P.C.; Jeffrey C. Hood; Joel L. Stevens

(57) ABSTRACT

System and method for user interfaces using remote control devices. More specifically, these user interfaces may be particularly useful for providing an intuitive and user friendly interaction between a user and a device or application using a display, e.g., at a "10 foot" interaction level. The user interfaces may be specifically designed for interaction using a simple remote control device having a limited number of inputs. For example, the simple remote control may include directional inputs (e.g., up, down, left, right), a confirmation input (e.g., ok), and possibly a mute input. These user interfaces may allow a user to quickly browse and filter lists of items, efficiently provide input (e.g., having multiple data types), customize directional and/or mute functionality of the remote control, perform camera control (e.g., for videoconferencing), etc.

20 Claims, 31 Drawing Sheets

(56) References Cited

U.S. PATENT DOCUMENTS

| | | | |
|---|---|---|---|
| 2004/0090315 A1* | 5/2004 | Mackjust et al. | 340/426.13 |
| 2004/0268391 A1* | 12/2004 | Clercq et al. | 725/37 |
| 2005/0005288 A1* | 1/2005 | Novak | 725/32 |
| 2005/0246660 A1* | 11/2005 | Fehrm | 715/810 |
| 2007/0206100 A1* | 9/2007 | Hikita | 348/211.7 |
| 2007/0236472 A1 | 10/2007 | Bentsen et al. | |
| 2008/0316295 A1 | 12/2008 | King et al. | |
| 2009/0273718 A1* | 11/2009 | Barbaroux et al. | 348/734 |
| 2009/0284577 A1* | 11/2009 | Kumar et al. | 348/14.02 |
| 2009/0307591 A1* | 12/2009 | Pham et al. | 715/716 |
| 2010/0188473 A1 | 7/2010 | King et al. | |
| 2010/0315483 A1 | 12/2010 | King | |
| 2011/0109715 A1* | 5/2011 | Jing et al. | 348/14.08 |
| 2011/0242268 A1* | 10/2011 | Kim et al. | 348/14.04 |
| 2011/0261148 A1 | 10/2011 | Goyal et al. | |
| 2011/0279631 A1 | 11/2011 | Ranganath et al. | |
| 2011/0304778 A1* | 12/2011 | Roberts et al. | 348/734 |
| 2012/0060088 A1* | 3/2012 | Hill et al. | 715/702 |
| 2012/0280803 A1* | 11/2012 | Sutardja | 340/12.23 |

OTHER PUBLICATIONS

U.S. Appl. No. 13/327,904, filed Dec. 16, 2011, inventor Wayne E. Mock.

Provisional U.S. Appl. No. 61/536,372, filed Sep. 19, 2011, inventors Feng et al.

* cited by examiner

CUSTOMIZING INPUT TO A VIDEOCONFERENCE USING A REMOTE CONTROL DEVICE

FIELD OF THE INVENTION

The present invention relates generally to user interfaces and, more specifically, to a user interface for a display using a simple remote control.

DESCRIPTION OF THE RELATED ART

In recent years, various devices which operate using a display have proliferated, particularly those associated with larger displays, e.g., for entertainment or videoconferencing. For example, there are currently many different types of gaming consoles, set top units, digital video recorders (DVRs), cable boxes, videoconferencing units, etc., all of which provide video signals to a video display, e.g., within a living room or conferencing room. Typically, these devices ship with remote control devices that are overly complex and frustrating to users. For example, current videoconferencing units often have associated remote control devices where individual buttons have overloaded functionality that is not apparent or ergonomic to a lay user. Accordingly, the user is often forced to look between the presented user interface on the display and the buttons on the remote control device multiple times to perform even simple tasks.

Thus, improvements in interactions between users and user interfaces are desired.

SUMMARY OF THE INVENTION

Various embodiments are presented of a system and method for user interfaces using remote control devices. More specifically, these user interfaces may be particularly useful for providing an intuitive and user friendly interaction between a user and a device or application using a display, e.g., at a "10 foot" interaction level.

In some embodiments, the user interfaces may be specifically designed for interaction using a simple remote control device. A "simple remote control device" may have a limited number of inputs and may be usable by the user without requiring the user to look at the remote control device during use. For example, the simple remote control device may have fewer than 8 inputs (e.g., 6 inputs). In one specific embodiment, the simple remote control may include directional inputs (e.g., up, down, left, right), a confirmation input (e.g., ok), and possibly a mute input.

Accordingly, the user interfaces may be designed with the simple remote control device in mind, thereby allowing a user to quickly and intuitively interact with the device or application without having to understand the functions provided by a complex remote control having overloaded functionality, as is typical in current systems.

As discussed below, these user interfaces may allow a user to quickly browse and filter lists of items, efficiently provide input (e.g., having multiple data types), customize directional and/or mute functionality of the remote control, perform camera control (e.g., for videoconferencing), etc.

The embodiments discussed herein may generally be usable for any user interfaces provided on displays, particularly those presented on larger displays that is not immediately proximate to the user (e.g., for displays 10 feet away). These user interfaces may be used for set top boxes (e.g., for watching television shows, movies, sports, etc.), gaming consoles, videoconferencing devices, home theatre PCs (HTPCs) or associated applications executing on the HTPCs, etc.

BRIEF DESCRIPTION OF THE DRAWINGS

A better understanding of the present invention may be obtained when the following detailed description is considered in conjunction with the following drawings, in which.

Figure 1:
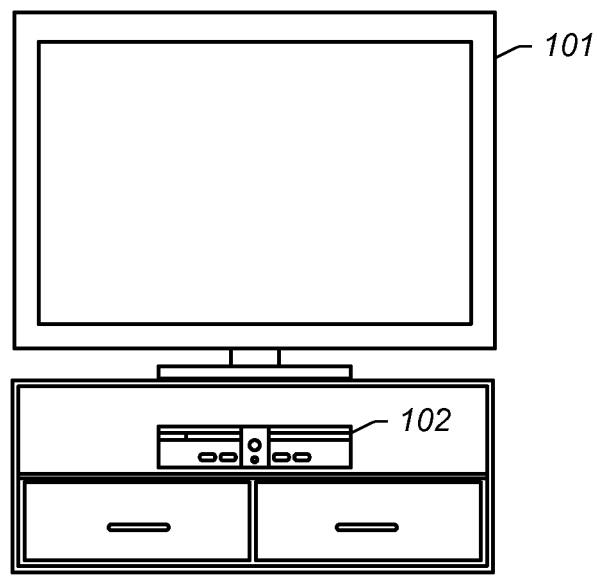
FIGS. 1 and 2 illustrate exemplary systems, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Conferencing System Utilizing a Mobile Communication Device as an Interface", Ser. No. 12/692,915, whose inventors are Keith C. King and Matthew K. Brandt, is hereby incorporated by reference in its entirety as though fully and completely set forth herein.

U.S. patent application titled "Controlling a Videoconference Based on Context of Touch-Based Gestures", Ser. No. 13/171,292, which was filed on Jun. 28, 2011, whose inventor is Wayne E. Mock is hereby incorporated by reference in its entirety as though fully and completely set forth herein.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Exemplary Entertainment System

FIG. 1 illustrates an exemplary embodiment of an entertainment system, e.g., for use in a user's living room. As shown, a display 101 may be used to display video of various devices or components, such as device 102. The device 102 may be any of various devices, e.g., gaming consoles (such as Xbox™ provided by Microsoft, Playstation™ provided by Sony, Wii™ provided by Nintendo, etc.), computer systems (e.g., HTPCs), digital video recorders (DVRs), streaming devices, cable or satellite devices (e.g., for viewing cable or satellite programming), set top boxes, videoconferencing devices, etc. The device 102 may include logic (e.g., processor(s) and memory medium(s) storing program instructions, and/or circuitry) for providing video signals to the display 101 for interaction by the user. The device 102 may be configured to provide various user interfaces for interaction by a remote control device on the display, as described herein.

Typically, the device 102 may be configured to perform a dedicated function. For example, a videoconferencing device's dedicated functionality may be to perform videoconferencing. Similarly, a gaming console's dedicated functionality may be to execute games. Accordingly, in some embodiments, the user interfaces described herein may be separate from the dedicated functionality. For example, in the case of a videoconference, various user interfaces may be presented for configuring the device or initiating/setting up videoconferences as opposed to actually performing the videoconference. Similarly, gaming consoles may have various user interfaces which are provided outside of the context of playing games (e.g., for social functions, set up, purchasing, etc.). As another example, a set top box may be provided for providing content and may have a user interface for selecting among a variety of content choices. Thus, in this example, the dedicated functionality may be providing the content and the user interfaces may be external to that dedicated functionality (although it may be used to select the content to be viewed).

In some embodiments, the display may include logic for performing any of the functionality described above. For example, the display may include a processor and memory medium for providing user interfaces as discussed herein, as well as any dedicated functionality described above. Further types of user interfaces, dedicated functionality, devices, etc. are envisioned.

Additionally, note that more than one device 102 may be coupled to the display. For example, each device may provide its own video signals to the display and the user may choose which of the device's video signals to display. Further, other devices may also be included, such as a receiver and speakers, video camera, etc.

Figure 2:
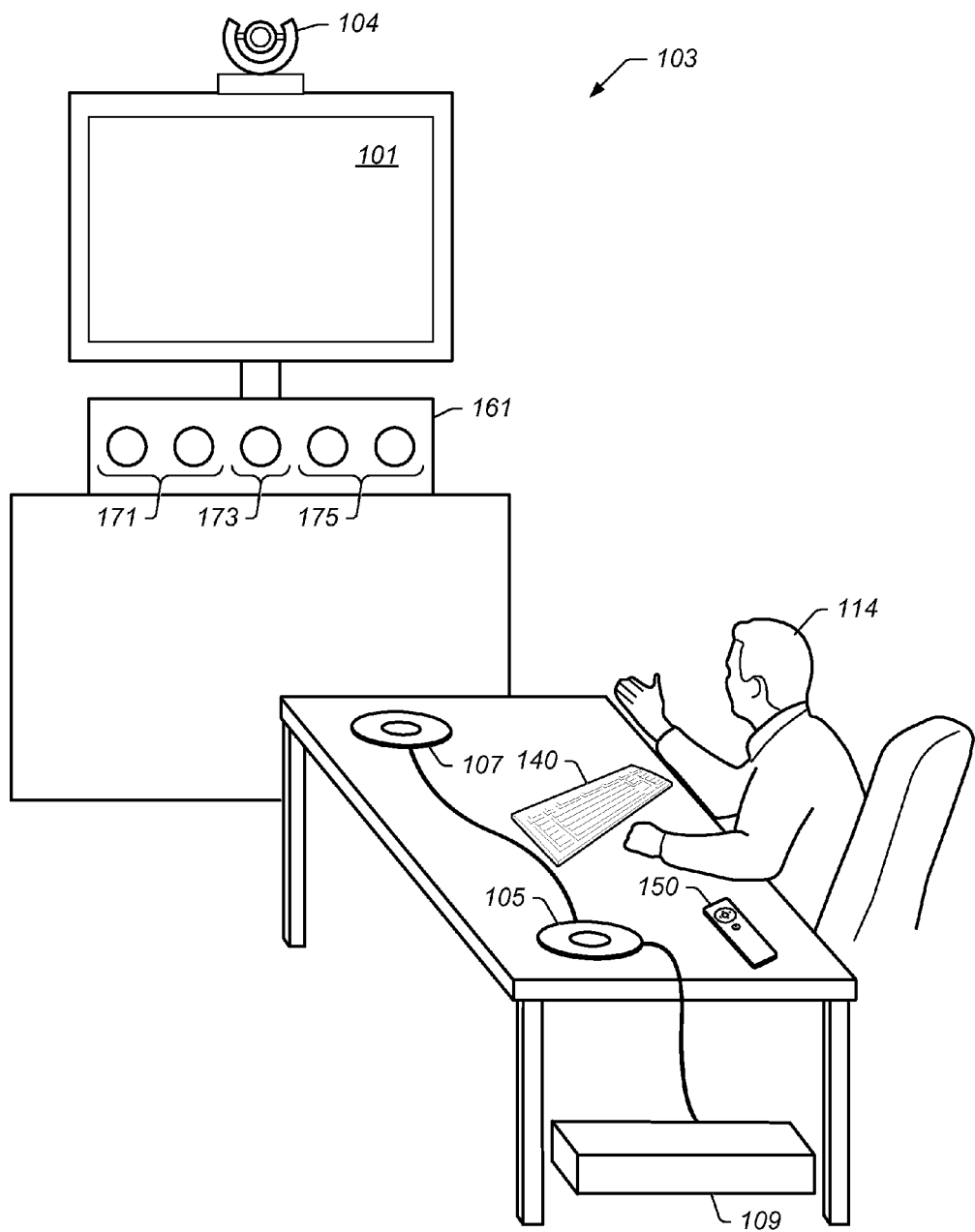

FIG. 2—Exemplary Videoconferencing Participant Location

FIG. 2 illustrates an exemplary embodiment of a videoconferencing participant location, also referred to as a videoconferencing endpoint or videoconferencing system. The videoconferencing unit may be configured to perform embodiments described herein, such as the provision of various user interfaces. The videoconferencing system 103 may have a system codec (or videoconferencing unit) 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints).

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

Figure 3:
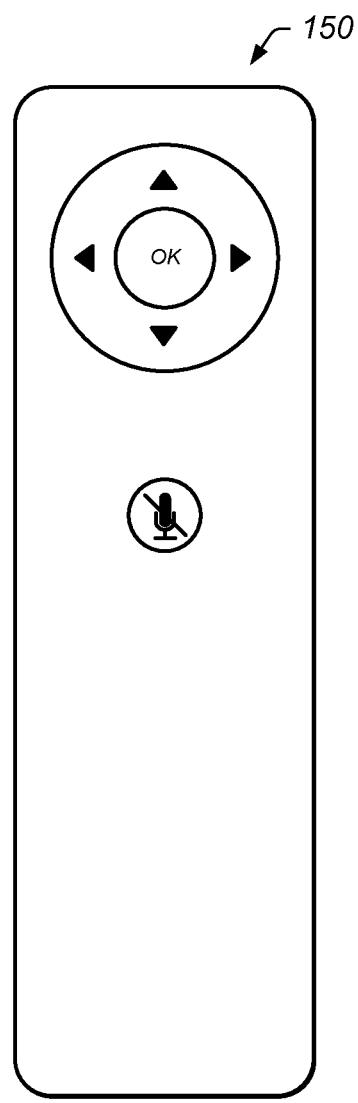
FIG. 3 illustrates an exemplary simple remote control device for interacting with user interfaces, according to an embodiment.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through various mechanisms, such as a remote control device, described herein. The remote control device may be implemented with a plurality of inputs, such as physical buttons and/or with a touch interface. In some embodiments, the remote control device may be implemented as a portion of other videoconferencing devices, such as the speakerphones 107 and/or 105, and/or as a separate device. FIG. 3 provides an exemplary embodiment of simple remote control device.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, input devices, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

As described herein, the videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference. The GUI may also present options for recording a current videoconference, and may also present options for viewing a previously recorded videoconference.

Note that the videoconferencing system shown in FIG. 2 may be modified to be an audioconferencing system. For example, the audioconference could be performed over a network, e.g., the Internet, using VOIP. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

When performing a videoconference, the various videoconferencing systems may be coupled in a variety of manners. For example, the videoconferencing systems may be coupled over wide area networks (e.g., such as the Internet) and/or local area networks (LANs). The networks may be wired or wireless as desired. During a videoconference, various ones of the videoconferencing units may be coupled using disparate networks. For example, two of the videoconferencing systems may be coupled over a LAN while others of the videoconference are coupled over a wide area network. Additionally, the communication links between the videoconferencing units may be implemented in a variety of manners, such as those described in the patent applications incorporated by reference above.

FIG. 3—Exemplary Remote Control Device

FIG. 3 illustrates an exemplary remote control device 150 which may be used to implement various embodiments described herein. In this particular example, the remote control device 150 is a simple remote control device having relatively few inputs. As shown, the remote control device 150 includes directional inputs (up, down, left, right), a confirmation input (ok), and a mute input. Note that these inputs may be implemented as physical buttons, in a touch interface (e.g., with haptic or other physical feedback and/or physical features indicating the locations of the inputs), or in any other desirable manner. Generally, the simple remote control device 150 may be implemented in a manner that allows the user to use the remote control device 150 without having to look at the remote control device 150. More specifically, the remote control device 150 may be implemented such that a user may look at the remote control device 150 and begin to use the remote control device 150 without requiring further analysis of inputs or layout (e.g., due to its simplicity). This design may allow the user to visually focus only on the display 101 rather than dividing visual focus between the display 101 and the remote control device 150. Accordingly, in conjunction with a properly designed user interface may lead to a more efficient and pleasant user experience.

While only six inputs are shown in FIG. 3, more or fewer inputs may be used. For example, an additional menu input (e.g., for accessing or clearing menus), power input (e.g., for turning a device on or off), etc. may be added. However, while additional inputs are contemplated, for a simple remote control device, fewer than 8 or 10 inputs may be desired so that the user can easily remember the location and purpose of each input without requiring visual analysis. Simple remote control devices may typically avoid having dedicated alphanumeric inputs. More complex remote control devices are also envisioned (e.g., having more than 8 or 10 inputs), but design must be carefully implemented in order to overcome the typical deficiencies of complex remotes noted above.

Additionally, while the remote 150 may be particularly devoted to embodiments concerning videoconferencing (e.g., where a mute input is generally desirable) other features may be more desirable for other types of devices or applications. For example, the mute input may be replaced by a menu input, a power on/off input, or may simply be removed, among other possibilities.

Following Descriptions

The following Figures and paragraphs describe various embodiments of user interfaces that may be used with the systems of FIGS. 1 and 2 as well as the remote control device of FIG. 3, although variations are envisioned. In one embodiment, these user interfaces may be used together within a larger user interface or menu system, such as shown in the exemplary user interface Figures. In the below, an embodiment of user interface (e.g., a feature of the menu system) may be described followed by descriptions of Figures showing an example of such a user interface. These user interfaces are only provided as examples of the described methods.

Figure 4:
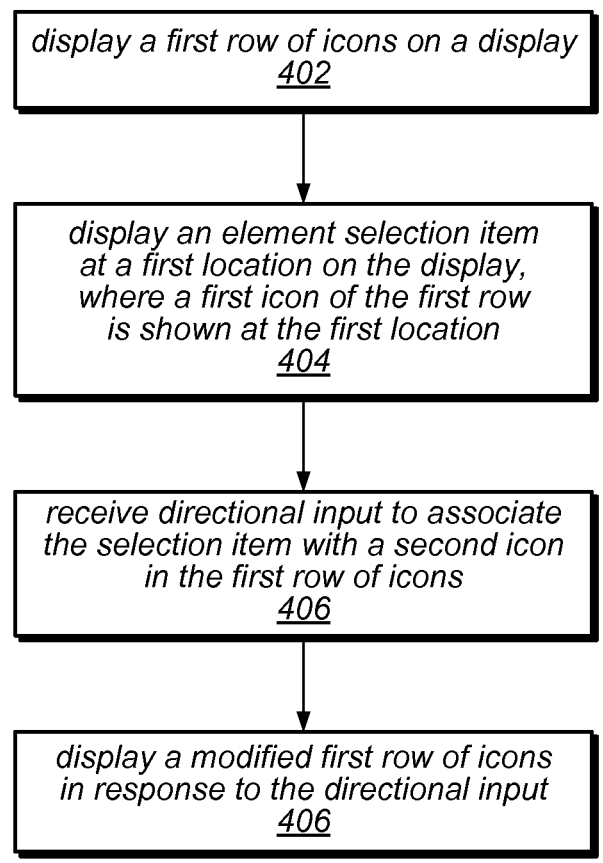
FIGS. 4 and 5 are flowchart diagrams illustrating embodiments of a method for providing a user interface for a simple remote control device.

FIG. 4—Providing a User Interface for a Simple Remote Control Device

FIG. 4 illustrates an embodiment of a method for providing a user interface having multiple items in a row. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a first row of items (e.g., icons) may be displayed on a display. For example, the first row of items may be displayed as a horizontal row in a top portion of the display. However, in alternate embodiments, the row may be a vertical row, e.g., displayed along a side of the display.

Each of the items may be selectable to perform a function. The function may be any of a variety of functions. For example, an item may be selectable to perform an action related to the respective item, e.g., such as activating a "do not disturb" state, entering a "sleep" state, beginning a presentation, etc. Alternatively, the item may be selectable to cause a second row of items related to the respective item to be displayed, as discussed below with respect to the method of FIG. 5. Further, the item may be selected to generate a list related to the respective item (e.g., each of which may be selectable to perform an action). Examples of these functions are provided and described in more detail below.

In 404, an element selection item (or "selection item") may be displayed at a first location on the display. Initially, a first item of the first row may be shown at the first location. More specifically, the selection item may indicate that the first item is currently selected. The selection item may be any visual indication that an element (in this case, the first item) is selected. In one embodiment, the selection item may be an icon that is displayed around or over a currently selected item to indicate that the item is selected. Additionally or alternatively, the selection item may be any visual indication of an item, such as highlighting of the item, increased size of the item, text accompanying the item, and/or animation of the item, among other possibilities.

In some embodiments, the selection item may include smaller icons, such as arrows (e.g., with animations, such as "bouncing" animations), which indicate the resulting actions of inputs of the remote control. For example, for a top level row (e.g., the initially displayed row that has no parent row), there may be no up arrow icon (assuming a top level horizontal row), but there may be left and right arrow icons indicating that the user can select items to the left or right. Thus, the selection item may provide visual indications of user input that may be received and/or the result of that input. Further examples of this behavior will be discussed below.

In 406, directional input may be received to associate the selection item with a second item in the first row of items. For example, a user may use a remote control device to provide the directional input (e.g., selecting up, down, left, or right inputs on the remote control device). More specifically, where the row is displayed as a horizontal row on the display, the directional input may be received as horizontal directional input (e.g., left or right input) to change from having the first item selected by the selection item to a second item being selected by the selection item. The second item may be immediately adjacent to the first item (e.g., it may be the item immediately to the left or right of the first item). Note that the user may wish to select an item that is more than one item away; however, the user will typically provide either continuous input (e.g., holding down a directional input) or multiple discrete inputs (e.g., selecting a directional input multiple times) to reach the desired item. Regardless, the input may typically request immediately adjacent items to reach the desired item.

In 408, a modified first row of items may be displayed in response to the directional input. More specifically, the first row of items may be moved by one item based on the directional input (e.g., in the direction opposite that indicated by the directional input). For example, in 404, the selection item may be positioned over the first item at a central location within the first row. In 406, the user may wish to highlight a second item to the right of the first item and may accordingly provide directional input to the right to cause the selection item to indicate selection of the second item. In response, in 408, the first row may be shifted to the left by one item, thereby causing the second item to be displayed at the same location as the selection item at the central location of the first row. Thus, in this particular embodiment, the selection item may remain in the same location, while the first item shifts from its initial location (that of the selection item) to one position to the left and the second item shifts from its initial location to the location of the selection item.

During this process, an item may disappear on the left side of the screen and a new item may appear on the right side of the screen, assuming a horizontal row and depending on the number of items in the first row. In some embodiments, the items may "wrap" where the left most item of the row (whether displayed or not) is adjacent to the right most item of the row (whether displayed or not). In a wrapping embodiment, a user may be able to reselect a particular item after providing a number of directional inputs (e.g., corresponding to the number of items in the row) in the same direction.

Accordingly, based on 408, the first item may no longer be selected and the second item may become selected. In some embodiments, a transition animation may be shown as the row is modified, showing the first item moving away from the selection item and the second item moving into the selection item. During the transition, the visual indications indicating that the first item is selected may disappear while they appear for the second item. For example, the first item may decrease in size while the second item increases in size. Additionally, text labeling the first item may disappear while text labeling the second item may appear. Any visual indications of the selection item may similar disappear from the first item and appear for the second item, e.g., in an animated fashion.

Note that in some embodiments, there may be a distinction drawn between an item (or icon) being selected and receiving input indicating acceptance of that item or confirming selection of the item. For example, confirmation of a selection (or input indicating acceptance of an item or selection of the item) may be performed by or in response to the user selecting an ok or confirmation input (e.g., as shown on the remote control device of FIG. 3). However, confirmation may also include providing a particular directional input that indicates confirmation of a previous selected item (e.g., by pressing the right directional input for a selected item displayed in a vertical list). Thus, the particular confirmation input may be context specific. Note that some functions may be performed in response to selection (e.g., without confirmation), such as displaying a submenu, whereas other functions may only be performed in response to confirmation of a selection (e.g., entering a "do not disturb" state). Generally, in any of the descriptions herein, any described actions may be performed in response to selection or confirmation of the selection, depending on the embodiment.

Figure 5:
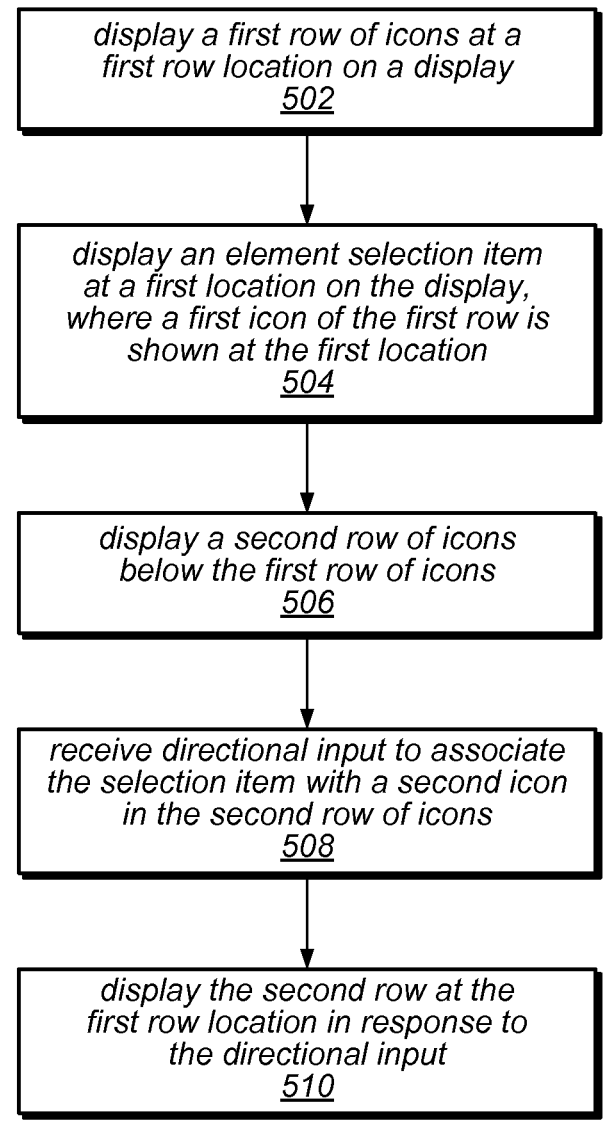

FIG. 5—Providing a User Interface for a Simple Remote Control Device

FIG. 5 illustrates an embodiment of a method for providing a user interface having multiple rows with multiple items. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a first row of items may be displayed at a first row location on a display, similar to 402 above.

In 504, an element selection item (or "selection item") may be displayed at a first location on the display, similar to 404 above. Also similar to above, a first item of the first row may be shown at the first location. In one embodiment, the first item (in FIG. 5) may have been selected as the second item as described in the method of FIG. 4.

In 506, a second row of items may be displayed adjacent to (e.g., below) the first row of items, e.g., based on the selection of the first item. For example, the first row of items may be displayed as a horizontal row of items along the top of the display. The second row of items may be displayed as a second horizontal row of items below the first row of items. The second row of items may all be associated with or related to the first item that is currently selected. For example, the second row of items may act as a submenu for the currently selected item. In some embodiments, the second row of items may be automatically displayed in response to selection of the first item. Alternatively, the second row of items may be displayed in response to confirmation of selection of the first item (e.g., and not displayed in response to only selection).

In some embodiments, the second row of items may have a "grayed out" or transparent appearance compared to the first row. For example, the items of the second row may have a higher transparency that the items of the first row. This appearance may indicate that the second row of items is not currently "in focus", e.g., until the user wishes to select an item in the second row. Other appearances which convey a similar meaning are also envisioned.

In 508, directional input may be received to associate the selection item with a second item in the second row of items. For example, where the rows of items are displayed in a horizontal orientation, and the second row is displayed below the first row (although other embodiments are envisioned), the user may provide down directional input using a remote control to select the second item which may be immediately below the first item. Note that the second item may be the item which was last selected in the second row of items. For example, the user may have previously accessed the second row of items and selected one of the items. Later, the user may have escaped the second row of items (e.g., by providing up directional input. Accordingly, the item of the second row immediately below the first item may be the item that was last selected in the second row of items. Thus, the second row may be "sticky" and may remain in its last position when redisplayed. However, other embodiments are envisioned where a default item of the second row of items is displayed immediately below the first item.

In 510, the second row may be displayed at the first row location in response to the directional input. More specifically, the second row of items may move into the position of the first row of items. The first row of items may be removed from the screen. Accordingly, the second row of items may no longer have a "grayed out" or "transparent" appearance since it is now in the position of the first row and "in focus". Additionally, similar to 408 above, the selection item (now indicating selection of the second item) may remain in the same location (e.g., centered in the first row location), and the second item may move into that position. Similar to descriptions above, an animation may be shown to indicate the transition of the second row moving from its original location to the first row location.

FIGS. 6A-6F—Exemplary Interfaces Corresponding to FIGS. 4 and 5

FIGS. 6A-6F are exemplary user interfaces which correspond to one embodiment of the methods of FIGS. 4 and 5. More specifically, these user interfaces correspond to an embodiment involving videoconferencing. These graphical user interfaces are provided as examples only and do not limit any of the embodiments described above.

Figure 6A:
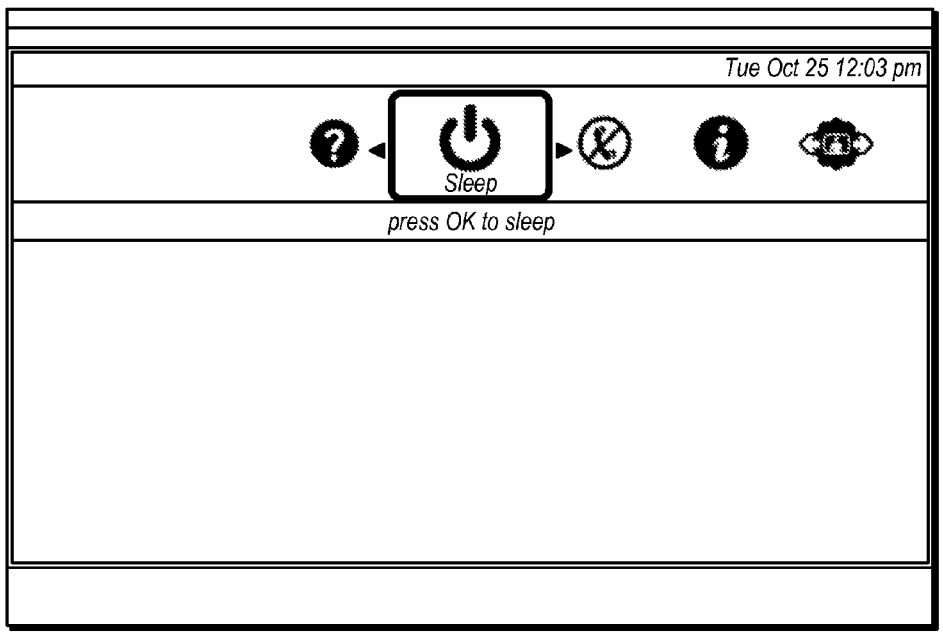
FIGS. 6A-6F illustrate exemplary interfaces corresponding to FIGS. 4 and 5, according to one embodiment.

FIG. 6A illustrates an exemplary user interface where a plurality of icons are shown in a horizontal row across the top of the display. As shown, a selection item indicates that the "sleep" icon is currently selected. In this particular embodiment, the "sleep icon" is enlarged relative to the other icons in the row and also includes text labeling the icon (in this case, the text "sleep" is shown below the icon). The remaining icons that are not currently selected do not have their text shown. Further, the icon is surrounded by a rectangular icon. Below this selection item is text describing the function or use of the icon (in this case, the text is "press OK to sleep"). Additionally, left and right arrows are displayed outside the rectangular icon on the left and right, respectively. These icons indicate that the user may provide directional input to the left and right to select icons to the left and right, respectively. In one embodiment, these icons may be animated, e.g., using a "bouncing" animation. Note that the selection item may be considered any of the above visual modifications which visually indicate that the sleep icon is currently selected.

In addition to the currently selected "sleep" icon, a "help" icon is shown on the left, a "do not disturb" icon is shown to the right, an "information" icon is shown to the right of that icon, a "connection" icon is shown to the right of that icon, and a portion of another icon is shown to the right of that icon. Further, in some embodiments (not shown in these Figures), a background image may be displayed within the user interface. The first row of icons may be semi-transparent (e.g., having 5%, 10%, 25%, etc. transparency, although other values are envisioned).

In FIG. 6A, the user may wish to select the icon immediately to the right of the "sleep" icon (in this particular case, the "do not disturb" icon). Accordingly, the user may provide directional input to the right (by selecting the right directional input of the remote control device) to select that icon. In response, the row of icons may be shifted to the left in an animated fashion, resulting in FIG. 6B. As discussed above, the visual indications indicating selection of the first icon may disappear for the first icon and appear for the second icon, (although in a manner consistent with the second icon).

Figure 6B:
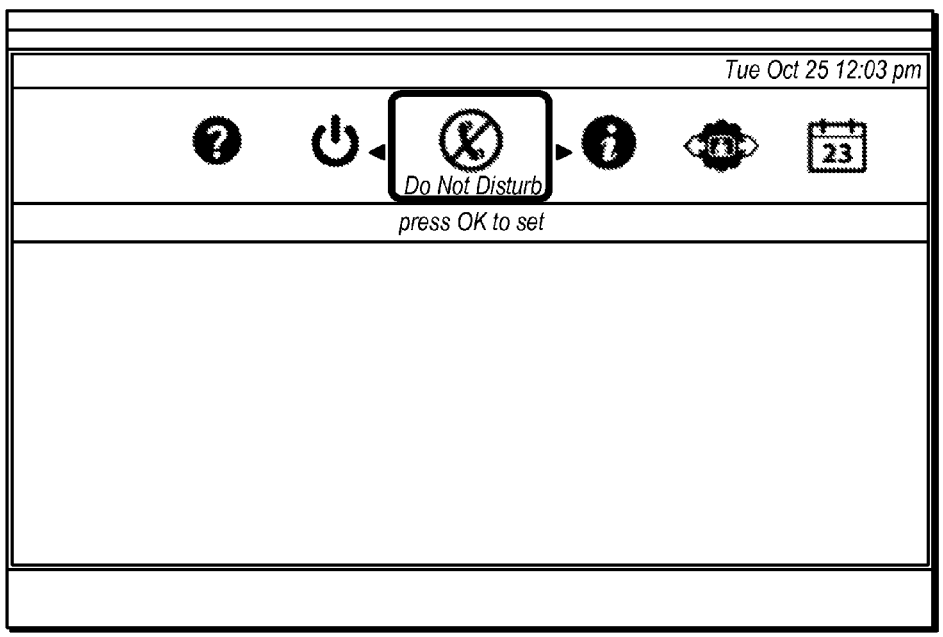

As shown in FIG. 6B, the "sleep" icon, which was previously selected, has shifted to the left and is no longer visually indicated by the selection item. More specifically, the icon has decreased in size, does not have any associated text, does not have a rectangular icon around it, etc. In contrast, the newly selected icon, "do not disturb", is now centered in the row, enlarged, has a label ("do not disturb"), has the rectangular icon around it, has left and right icons outside of the rectangular icon, and has text describing its use ("press OK to set"). Because all of the icons have decreased shifted, a new "calendar" icon has appeared as the farthest icon to the right in the row. Additionally, note that the first and second icons of FIGS. 6A and 6B have an associated action which may be performed in response to confirmation of their selection.

Figure 6C:
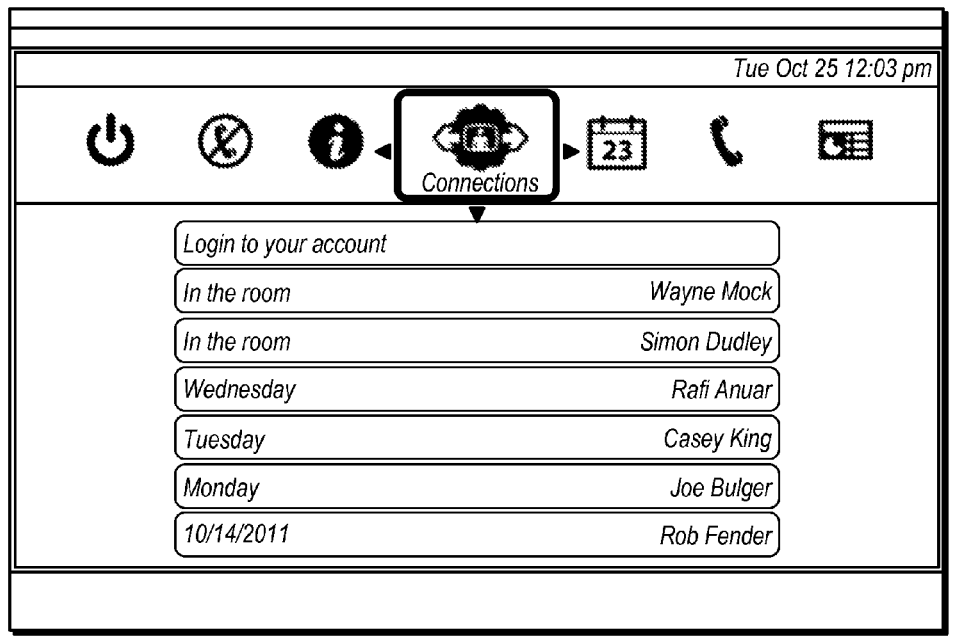

In the example of FIG. 6C, the user has provided right directional input twice (repeating the shifting actions as in FIGS. 6A and 6B) to select the "connections" icon. For this icon, a list or table of items is displayed below the first row. As shown, a new down arrow icon is shown, indicating that the user can select items in the list of items. More specifically, various users or previous users may login to the videoconferencing endpoint by selecting the items.

Figure 6D:
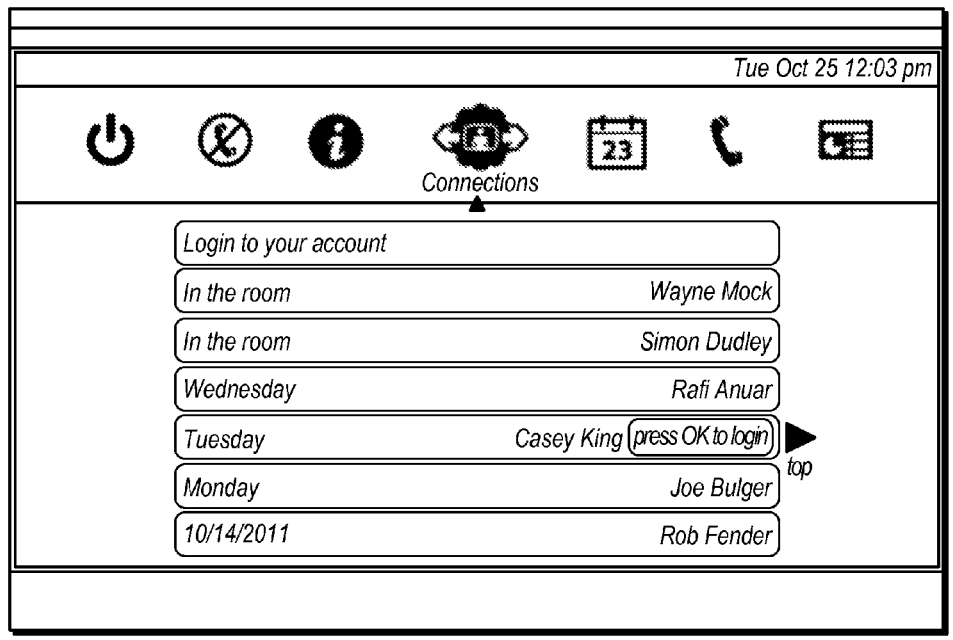

As shown in FIG. 6D, the user has selected the item "Tuesday"—"Casey King", which is visually indicated by a highlight around the box of the item, as well as the right arrow next to the item (with the text "top" indicating that the user can provide the right directional input to move to the top of the list) and the text "press OK to login", indicating that confirming the selection will log in "Casey King". As also shown in FIG. 6D, an up arrow icon is shown below the "connections" icon in the row of icons, indicating that the user can return back to the menu by reaching the top of the list (e.g., by providing the right directional input) and pressing the up directional input.

Figure 6E:
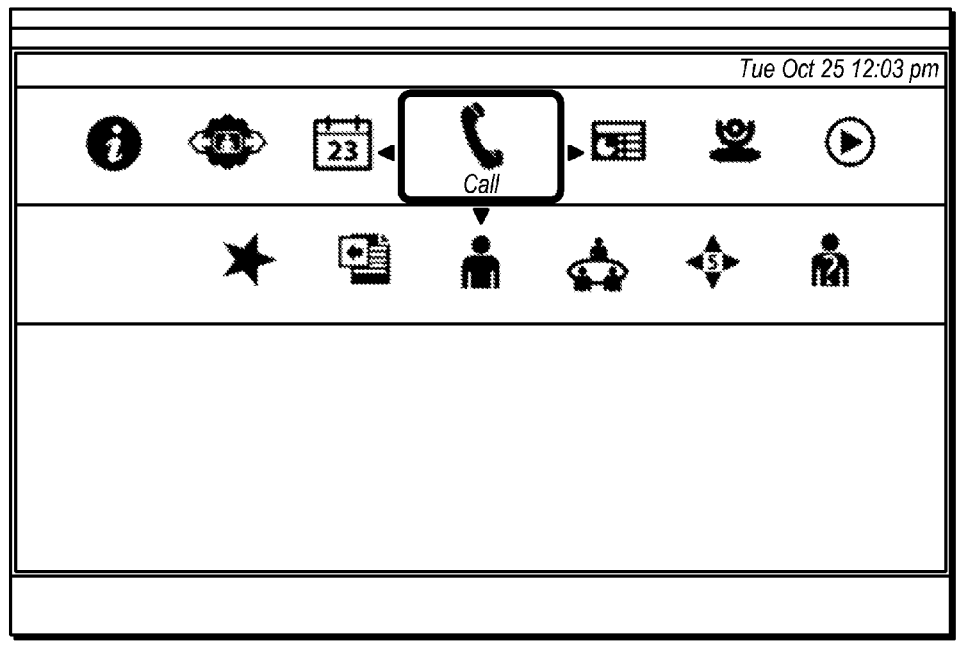

In FIG. 6E, the user has returned to the first row of icons and selected the "call" icon. In response to selection of the "call" icon, a second row of icons associated with the "call icon" is displayed below the first row of icons. For the "call" icon, the user can select left or right directional inputs to select icons to the left or right of the "call" icon or may access the submenu in the second row of icons by selecting the down directional input, as is indicated by the arrow icons around the "call" icon. In this case, the icon immediately below the "call" icon is a "directory" icon. As indicated above, the "directory" icon may have been the last icon selected in this submenu and may therefore remain in the position under the "call" icon. Alternatively, the "directory" icon may be the default icon associated with the "call" icon and may always be displayed underneath the "call" icon when the "call" icon is selected.

Figure 6F:
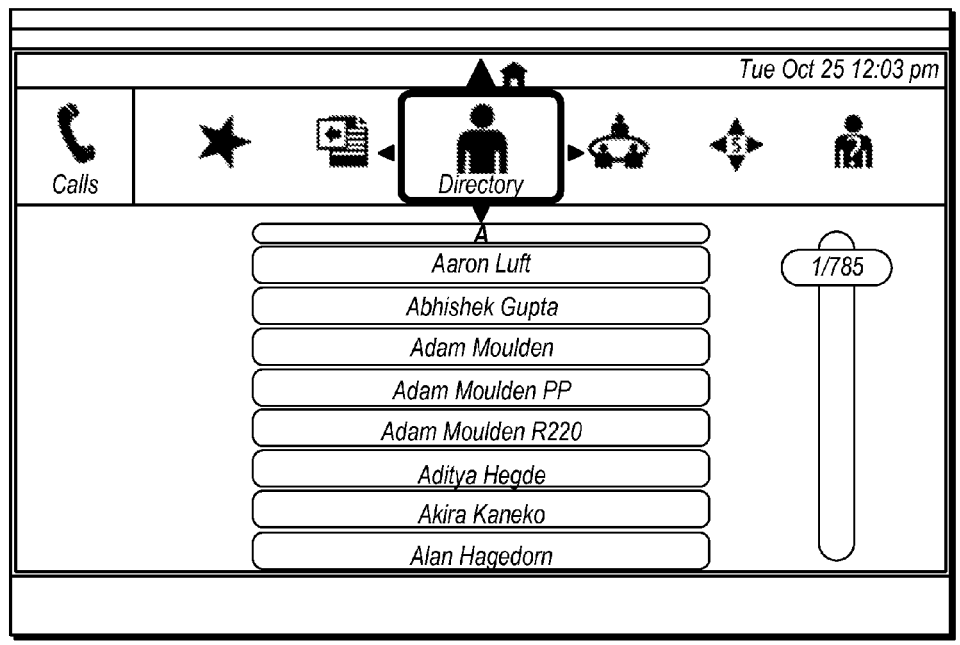

In FIG. 6F, the user has selected the down directional input. Accordingly, the second row has now moved into the first or primary row location and the first row has disappeared. At this point, the "directory" icon is indicated as selected by the selection item". From this point, the user can choose any direction: left to select the icon to the left, right to select the icon to the right, down to access the list of contacts (in this case, there are 785, as indicated by the scroll bar to the right of the list), and up to access the previous, top-level menu. The fact that the previous upper level menu is a top level menu is indicated by the "home" icon next to the up arrow icon displayed above the rectangle of the selection item. Note further that the parent icon is shown on the left (in this case "calls") indicating which parent icon the submenu belongs to. This icon may be visually indicated in a different color and transparency and may remain in this position (e.g., may be "static") regardless of how the user selects the various submenu icons within the call submenu. As shown in FIG. 6F, the list of contacts is sorted by first word in alphabetical order.

As can be seen, in the embodiment shown in FIGS. 6A-6F, the selection item generally maintains a constant position for the rows of the user interface. Accordingly, the user is able focus on a single position of the display without having to visually roam the display. Additionally, the user interface provides visual indications of the functions of the various inputs of the remote control device for the user, e.g., at or near the point of focus. Accordingly, the user can quickly perform desired actions without encountering confusion.

Figure 7:
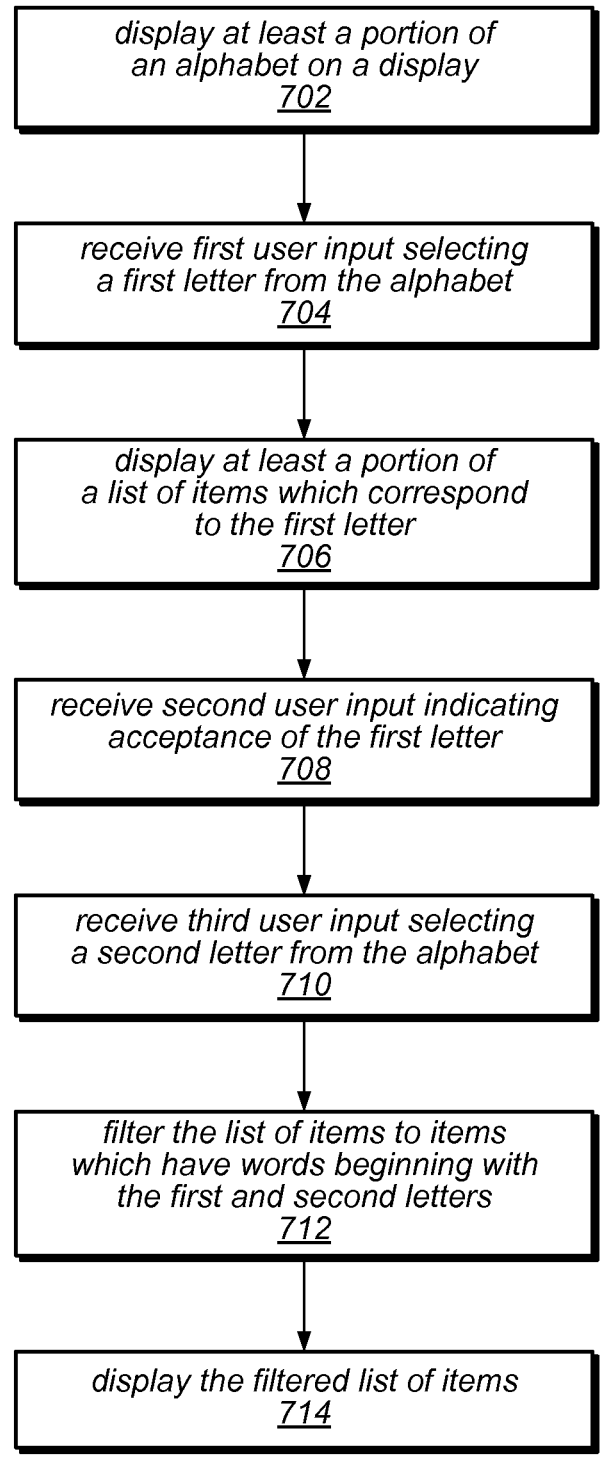
FIG. 7 is a flowchart diagram illustrating an embodiment of a method for browsing and filtering a list of items using a remote control device.

FIG. 7—Browsing and Filtering a Plurality of Items

FIG. 7 illustrates an embodiment of a method for providing a user interface for browsing and filtering a plurality of items using a remote control device. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 702, at least a portion of an alphabet may be displayed on a first portion of a display. Additionally, a list of items may be displayed on a second portion of the display. For example, the list of items may be contacts, e.g., for performing a videoconference, although any list of items that a user wishes to select from is envisioned.

In one embodiment, the list of items may be a full list of the items (e.g., none of the items may be initially filtered). The list of items may be sorted, e.g., alphabetically, although other types of sorting are envisioned. In one specific example, the list of items may be sorted alphabetically, e.g., by the first word, first name, last name, etc. of each item. The alphabet (or portion thereof) may be used to quickly browse the list of items, as discussed below. In some embodiments, the alphabet may not be initially displayed. For example, the list of items may be initially displayed and user input (e.g., directional input) may be received to spawn the alphabet list interface element. Alternatively, the alphabet interface element may be displayed with the list of items by default. Generally, the user may be able to either browse through the list of items (e.g., based on directional input) or browse through each letter in the alphabet.

In 704, first user input selecting a first letter from the alphabet may be received. For example, the user may use directional input within the alphabet interface (e.g., by moving away from the list of items) and may select a letter of the alphabet. In one embodiment, an initial letter (such as "a") may be selected by default when the user begins using the alphabet interface. The user may provide directional input to select other letters.

Accordingly, in 706, at least a portion of a list of items which correspond to the first letter may be displayed. As an example, the user may select the letter "b" in 704. Accordingly, in 706, the list of items which correspond to that letter may be displayed. As a specific example, the list of items may have been initially displayed with items having a first letter of "a" being displayed (depending on the initial sort order). Accordingly, after the user selects the letter "b", the displayed portion of the list may be automatically updated to show those items beginning with the letter "b" (e.g., causing the ones beginning with the letter "a" to no longer be displayed). In one embodiment, the portion may be displayed as a filter (i.e., only those items beginning with the letter "b" may be displayed, although other requirements, such as containing "b", having a word beginning with "b", having a last name beginning with "b", etc. are envisioned). Alternatively, the portion of the list may simply be modified to skip to the letter "b" such that the top entry is the first having the letter "b" according to whichever requirement is used (e.g., first letter of first word). Thus, the list of items may not be filtered, but the alphabet may be used to "skip to" that portion of the list.

In 708, second user input indicating acceptance or confirmation of the first letter may be received. As discussed above, the acceptance or confirmation of the first letter is different than the selection of the first letter. For example, selecting the first letter may simply involve highlighting (e.g., while scrolling through the letters) the first letter using directional input. However, confirmation of the first letter may involve additional user input after selecting the first letter. For example, the additional user input may be the user providing confirmation input, such as pressing an ok input on the remote control device or the user providing a directional input (e.g., in a direction orthogonal to scrolling through the alphabet), among other possibilities.

In one embodiment, after confirmation of the first letter, a new filtering mode may be initiated, which is discussed in more detail below with respect to 712 (incorporating two letters). Additionally, the user interface may indicate that the first letter has been confirmed and there may be a visual indication that selection of a next letter can be provided (as in 710 below). For example, the first letter may be shown on the display in a field and a cursor or other indicator may be shown next to the first letter, indicating that input for a second letter may be received. Additionally, the user may erase or remove confirmation of the first letter, e.g., by providing directional input orthogonal to the alphabet (such as providing left input for a vertically aligned alphabet).

In 710, third user input selecting a second letter from the alphabet may be received. Similar to 706 above, the user may select a new letter, in addition to the first letter.

In 712, the list of items may be filtered to items which have words beginning with the first and second letter concatenated, and, in 714, that filtered list may be displayed. For example, instead of simply "skipping to" a portion of the list, e.g., as in 706, the list may be reduced in size so as to only display items in the list which meet the criteria (in this case, items which include words beginning with the first and second letter in sequence). Accordingly, the filtered list may be displayed instead of the full list of items in the second portion of the display.

In one specific example, if the user has selected and confirmed "b" and selected "e" for the second letter, the method may determine any items which contain a word that begins with "be". However, note that this is one embodiment only, and other filtering mechanisms are also possible. For example, the method may only filter for the first word or last word in the item. Alternatively, the method may filter based on any items that include any instance of the two letters in the specified sequence, regardless of the location of that instance (e.g., there may not be a requirement that words begin with those two letters, only that there is some word that contains those two letters in sequence).

As indicated above, this mode may be entered upon confirmation of the first letter in 708. Accordingly, after 708, the list of items may be filtered for any items which include words beginning with the first letter. Further, note that in one embodiment, the list of items may not be filtered for the first and second letter until confirmation of the second letter. For example, the list may remain as filtered only for the first letter even while a second letter is selected, and the filtered list may only be further filtered after the user has confirmed selection of the second letter. However, in alternate embodiments, upon entering the filtering mode (e.g., once a first letter has been confirmed), selection of a second letter may result in further filtering, even without confirmation of the second letter. However, in this embodiment, confirmation of the second letter may allow for a third letter to be input. Thus, the user may begin to "type" filtering criteria by selecting and confirming letters using the alphabet interface.

While the above has been described specifically with regard to alphabets and items including words, similar embodiments may be performed for searching other types of items or using criteria other than an alphabet. For example, a list of IP addresses could be filtered using a list of numbers. Thus, the method may be expanded to apply to any list of items with a corresponding interface for selecting and confirming portions of those items (e.g., such as numbers for a list including numbered items). Additionally, a combination of types may be used (e.g., numbers and letters) in the interface, as desired.

FIGS. 8A-8G—Exemplary Interfaces Corresponding to FIG. 7

FIGS. 8A-8F are exemplary user interfaces which correspond to one embodiment of the method of FIG. 7. More specifically, these user interfaces correspond to an embodiment involving videoconferencing. These graphical user interfaces are provided as examples only and do not limit any of the embodiments described above.

Figure 8A:
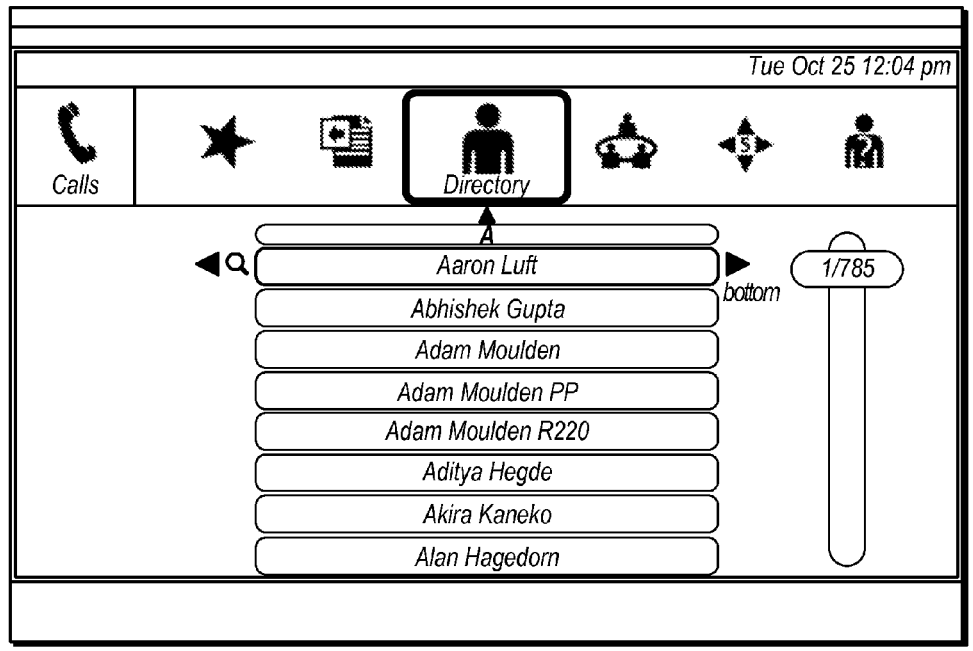
FIGS. 8A-8G illustrate exemplary interfaces corresponding to FIG. 7, according to one embodiment.

FIG. 8A illustrates a continuation of the user interface from FIG. 6F. As shown in this Figure, the user has provided down directional input from the directory menu item and has selected the first item in the directory—in this case, "Aaron Luft". As visually indicated in the user interface, the user may provide the up directional input to return to the call submenu (with the "directory" icon selected, as shown in FIG. 6F). Additionally, the user may skip to the bottom of the list by providing the right directional input, as indicated by the right arrow icon and the text "bottom". The interface of FIG. 8A also indicates the position of the user in the list of items using a scroll bar and the text "1/785" on the scroll bar. Thus, the user is immediately aware that there are 785 entries in this list and he is currently located at the top. The user may also provide left directional input to invoke a search tool, shown in FIG. 8B.

Figure 8B:
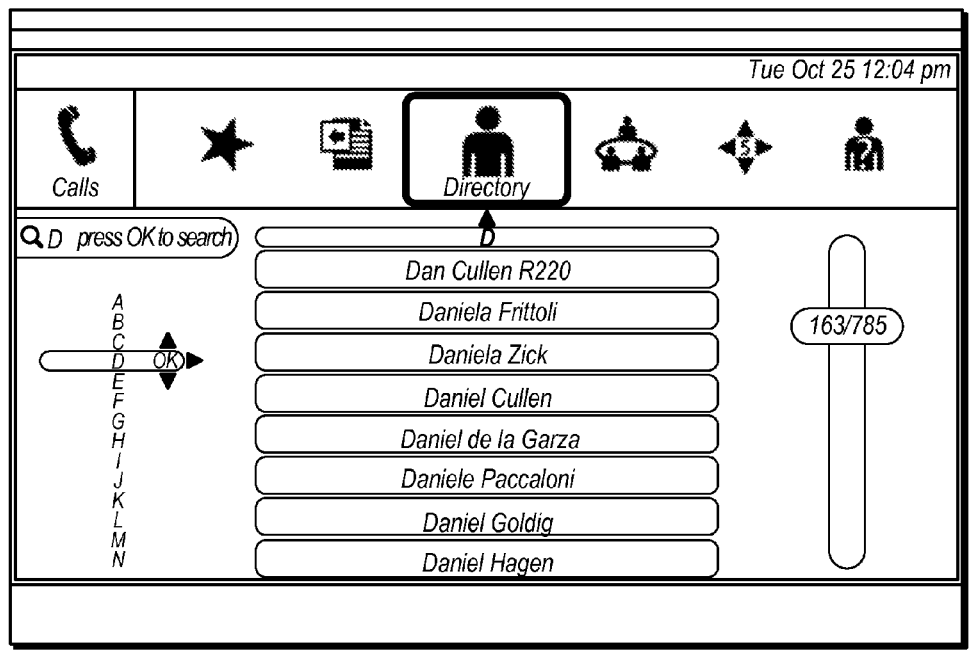

More specifically, in FIG. 8B, the user has invoked the search tool (in this embodiment, by selecting the left directional input of the remote control device) and has selected the letter "D" (e.g., by selecting the down directional input three times, assuming the alphabet interface initially began at the letter "A"). As shown, the alphabet is displayed in a vertical fashion along the left side of the user interface. Only a portion of the alphabet is shown (A-N) due to size constraints, but the user may scroll down past "N" to the end of the alphabet as desired (the user interface may update accordingly). As indicated by the user interface, the user may scroll up and down by providing the directional up and directional down inputs to select different letters of the alphabet. Additionally, the user may return to the list of items by providing the directional right inputs, as indicated by the right arrow icon shown to the right of the selection item, indicating that "D" is currently selected.

Because the letter "D" is currently selected, the portion of the user interface showing the list of items now shows items which have a first word beginning with the letter "D". In this particular instance, the top of the portion of the list is "Dan Cullen R220". The scroll bar has changed to indicate that this is item 163 of 785 entries. Thus, the user has skipped to items beginning with the letter "D" by selecting the letter "D" in the alphabet interface. However, as indicated in the user interface, the user may provide the OK input to search the list of items. This feature is indicated first in the selection item and second in the search field shown on the left of the interface, above the alphabet.

Figure 8C:
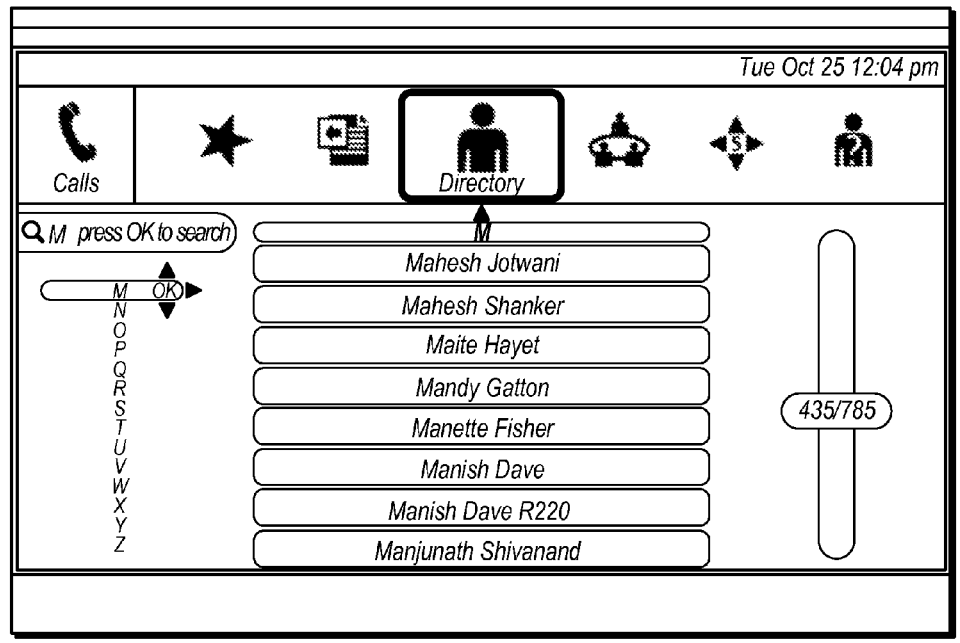

In FIG. 8C, the user has scrolled to the letter "M" in the alphabet interface, and the list of items has been updated, similar to the letter "D" in FIG. 8B. As shown, the top entry is "Mahesh Jotwani", which is item 435 of 785. After this interface, the user has confirmed the letter "M".

Figure 8D:
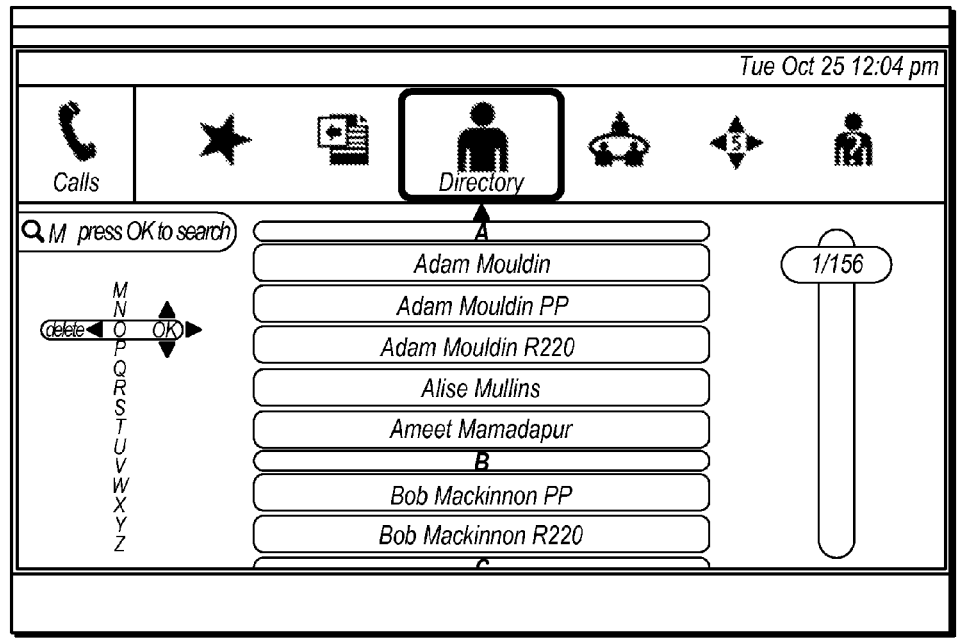

Accordingly, in FIG. 8D, the list of entries has been filtered to only show items which include a word that begin with the letter "M". Accordingly, the filtered list is only 156 entries (indicated by the scroll bar) rather than the original 785 entries. As also shown in FIG. 8D, the user has now selected the letter "O". However, the list has not been filtered to show entries which have words that begin with "MO" because the user has not confirmed the letter "O" yet (although other embodiments where this confirmation is not necessary for filtering are envisioned). Note that the interface now also indicates that the user may delete the letter "M" by providing the left directional input, as indicated by the left arrow and text "delete" shown in the selection item.

Figure 8E:
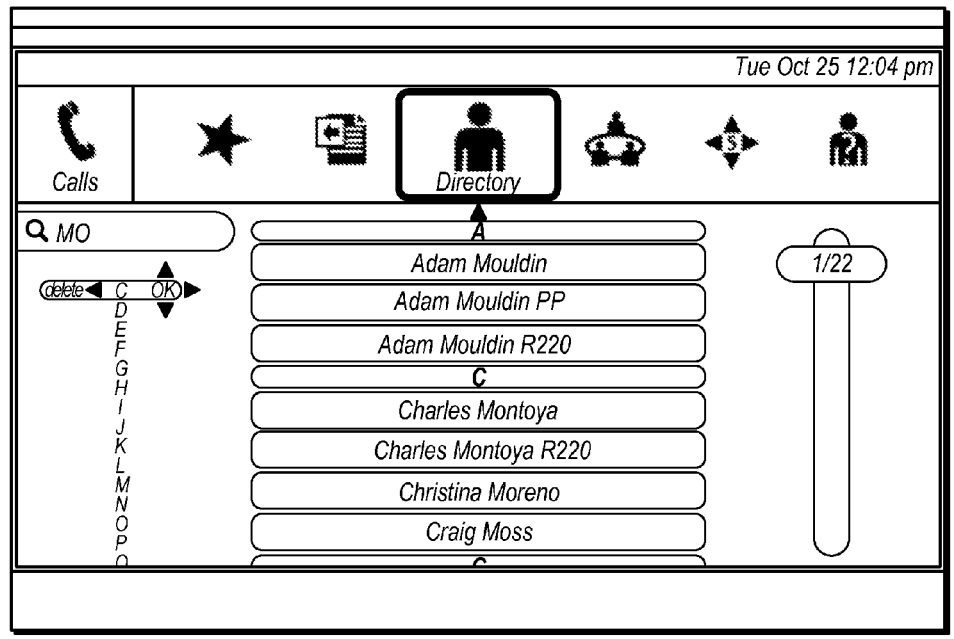

In FIG. 8E, the user has confirmed selection of the letter "O" and is now selecting the letter "C". The list has now been filtered to 22 items, which include one or more words which begin with the letters "MO".

Figure 8F:
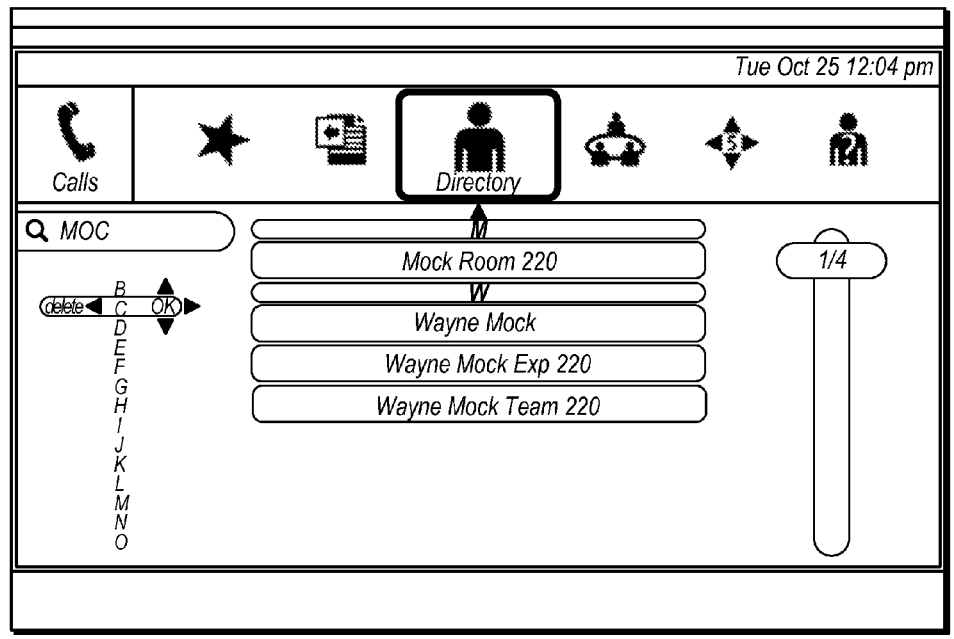

In FIG. 8F, the user has confirmed selection of the letter "C". As shown, the list has now been filtered to 4 items, which includes words which begin with the letters "MOC". As shown, these items include "Mock Room 220" (where the initial word begins with "MOC"), "Wayne Mock", "Wayne Mock Exp 220", and "Wayne Mock Team 220" (where words after the first word begin with "MOC").

Figure 8G:
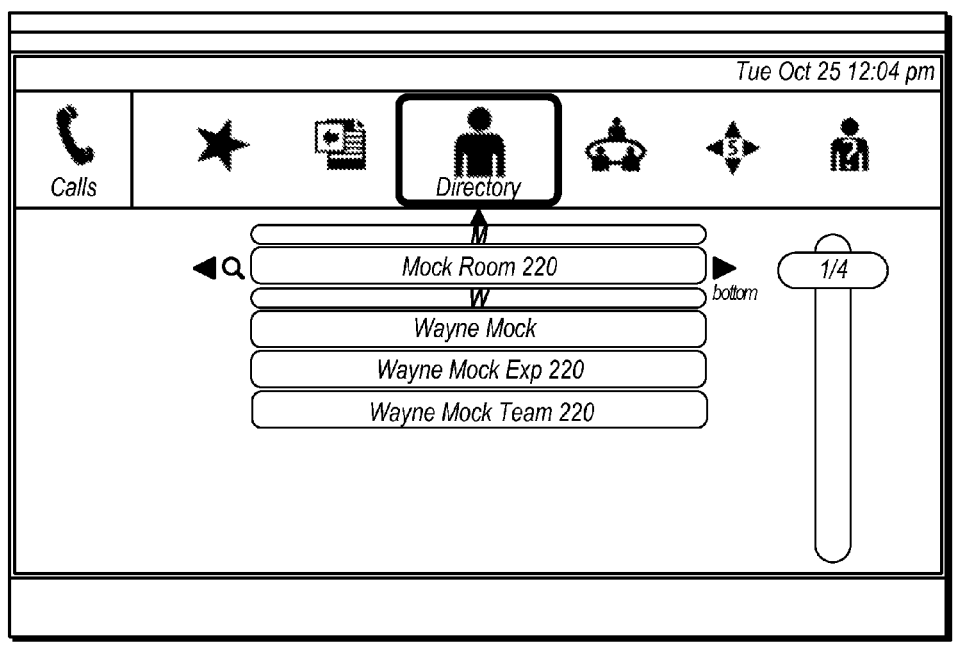

Finally, in FIG. 8G, the user has provided the right directional input to return to the list, resulting in selection of the top entry "Mock Room 220". The user may now select any of the four entries (e.g., to begin a videoconference call, e.g., after confirmation) or return to the call submenu, as desired.

Figure 9:
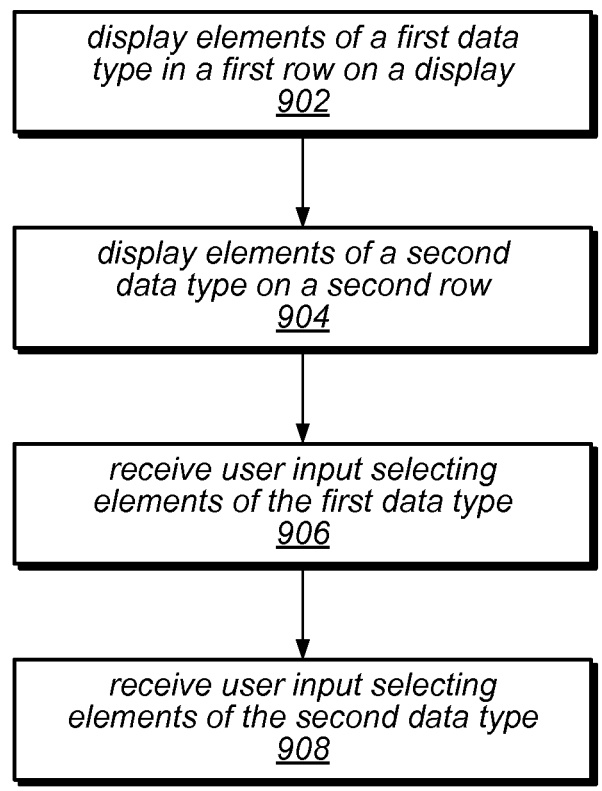
FIG. 9 is a flowchart diagram illustrating an embodiment of a method for receiving input having a plurality of data types using a remote control device.

FIG. 9—Receiving Input with a Plurality of Data Types

FIG. 9 illustrates an embodiment of a method for providing a user interface for receiving input with a plurality of data types using a remote control device. The method shown in FIG. 9 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 902, elements of a first data type (or "input type") may be displayed in a first row on a display. For example, the data type may be alphabet, numbers, punctuation, bandwidth, protocol specification, or any of a variety of data types. In one embodiment, the elements of the first data type may be only displayed in the first row. Additionally, or alternatively, elements of the first row may only be of the first data type. However, other embodiments are envisioned where more than one data type is shown in the first row, e.g., but elements of the first data type are not displayed outside of the first row. In one particular embodiment, the first row may include numbers and possibly elements of another data type, such as punctuation or special characters (e.g., ".", "*", "#"). The additional data types may be useful for certain types of input, e.g., for providing an IP address.

In 904, similar to 902 above, elements of a second data type may be displayed on a second row. In one particular embodiment, the second row may include alphabet characters, e.g., and no other data type. In some embodiments, the first and second rows may be displayed adjacent to each other. For example, the first and second rows may be horizontal rows (although vertical rows are also envisioned) and the first row may be displayed immediately above the second row. However, these rows may also be separated by other user interface elements, as desired.

In addition to the first and second rows, other rows may also be displayed, e.g., for other data types. However, the data types in the additional rows may not be restricted to a single row (although such embodiments are envisioned). For example, one data type may be spread across multiple rows, e.g., due to size. As another example, a certain data type may have its own dedicated row, but may also be included in other rows. For example, a row may be dedicated for punctuation marks, but punctuation marks may also be included in another row (e.g., the first row, for making certain types of user input easier, such as entering IP addresses).

In one embodiment, the rows may each be independent of each other. For example, a selection item may be used to indicate current selection of elements in the rows. As a user moves from one row to the next, the selection item may not move as in a grid. Instead, when moving from row to row, the selection item may be automatically moved to a certain element in the next row, regardless of the previously selected element in the previous row. For example, each row may have a default initial element, which may be automatically selected when the row is used. Additionally, or alternatively, the last element selected for a row may be stored such that when the row is used again, that element is selected again. Thus, if the user previously selected the third element of the second row, when the user moves from the first row to the second row, the third element may be selected, regardless of what element of the first row was selected. Thus, the previously selected element of the first row and the currently selected element of the second row may not be vertically aligned. In some embodiments, this independence may even be applied to rows which have the same data type (e.g., where a data type is spread over two rows).

In 906, user input selecting elements of the first data type may be received. For example, the user may select an element of the first data type in the first row using directional input. The user may specify a portion of an input field by confirming various ones of the elements of the first data type (e.g., by providing confirmation input).

In 908, user input selecting elements of the second data type may be received. Similar to 906, the user may select and confirm various elements of the second data type in the second row. In one embodiment, the user may specify complete specification of the input field using the elements of the second data type. For example, the user may specify a complete input to the input field using both elements of the first data type and the second data type (and/or additional data types), as desired.

As shown in FIG. 3, the remote control device (e.g., used to specify the user input) may not include inputs for elements of the first and second data type (e.g., may not include inputs for specific number or alphabet characters). For example, in one embodiment, the user input in 906 and 908 (e.g., to provide the input to a single input field) may be received only using directional inputs and a confirmation input.

In some embodiments, this user interface layout and input method may offer significant advantages over present grid input user interfaces. In such interfaces, a user may have a plurality of rows for a data type, whose selection is not independent, unlike descriptions above. For example, a first row may have the letters "a-i", a second row may have the letters "j-q", and a third row may have the letters "r-z". The first, second, and third rows may form a grid of letters. When providing user input using such a grid, a user must determine, for every letter, which row and position each next letter is, compare that position to the current position, and determine a route to reach the next position. This process is extremely cumbersome and inefficient.

In contrast, when using a single row that is dedicated to the alphabet (as an example), the user merely has to evaluate whether the next letter is before or after the current letter and move accordingly, which is much more efficient. Additionally, for letters that are further away (e.g., moving from "a" to "z"), the user may be able to hold a direction input down (to provide the input continuously) in order to move more quickly across the letters. When using multiple data types, the user merely has to determine which row has the next data type and move to it. Thus, the user does not have to perform as much processing when providing input and is able to provide input in a more efficient manner.

FIGS. 10A-10I—Exemplary Interfaces Corresponding to FIG. 9

FIGS. 10A-10I are exemplary user interfaces which correspond to one embodiment of the method of FIG. 9. More specifically, these user interfaces correspond to an embodiment involving videoconferencing. These graphical user interfaces are provided as examples only and do not limit any of the embodiments described above.

Figure 10A:
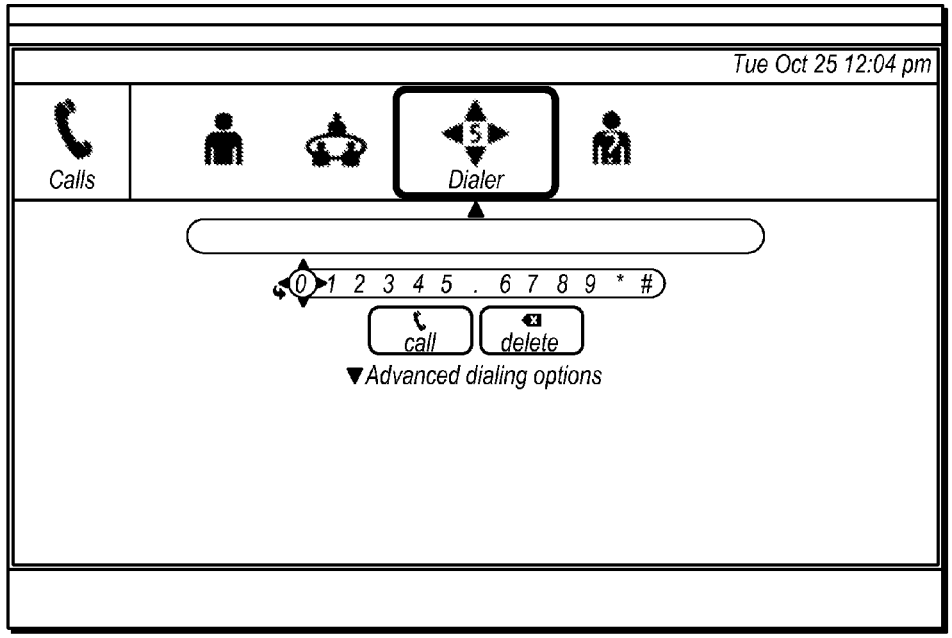
FIGS. 10A-10I illustrate exemplary interfaces corresponding to FIG. 9, according to one embodiment.

FIG. 10A illustrates an exemplary user interface where the user has selected the "dialer" icon within the "calls" submenu. As shown, there is an input field for specifying the number to dial. The number "0" is currently selected with a horizontal interface for specifying numbers as well as other punctuation. In this particular interface, from the left to right, the elements are: "0", "1", "2", "3", "4", "5", ".", "6", "7", "8", "9", "*", "#". Thus, this first row includes elements of the data type "numbers" as well as additional punctuation data types. Accordingly, the user may specify a phone number or IP address by traversing the first row to the left and to the right and by confirming selection of various elements in the row. The user may call or delete characters using the call or delete icons shown in the Figure.

Figure 10B:
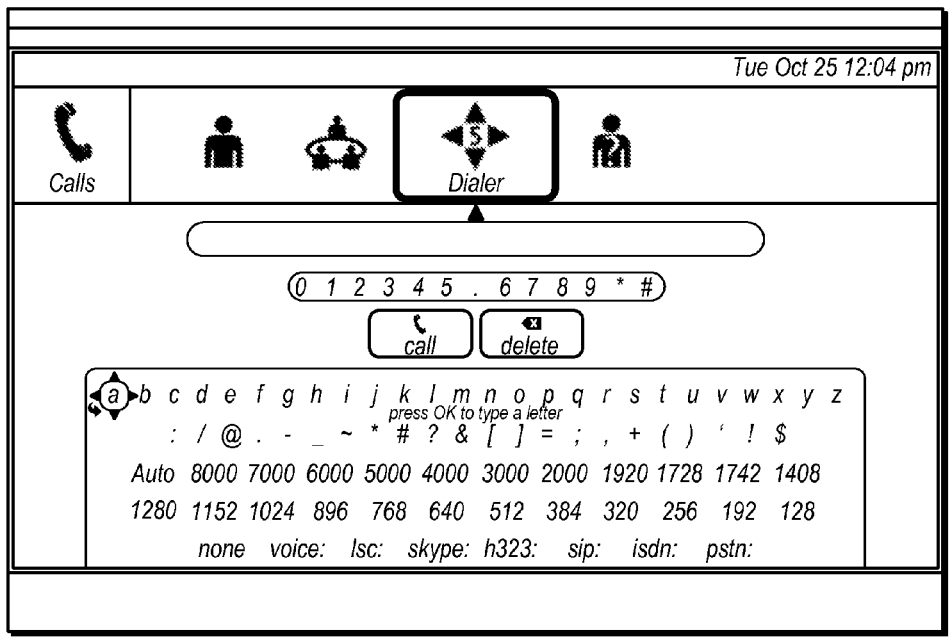

In FIG. 10B, the user has activated the advanced dialing options by providing down directional input from the call or delete icons. As shown in FIG. 10B, the element "a" of the initial row (referred to as the "second row") of the advanced dialing options is currently selected. In this example, the second row is dedicated to alphabet characters. More specifically, the alphabet characters are all shown on the second row and are not provided in other rows. As also shown, the third row includes punctuation, the fourth and fifth rows are dedicated to bandwidths, and the sixth row is dedicated to communication protocols.

Figure 10C:
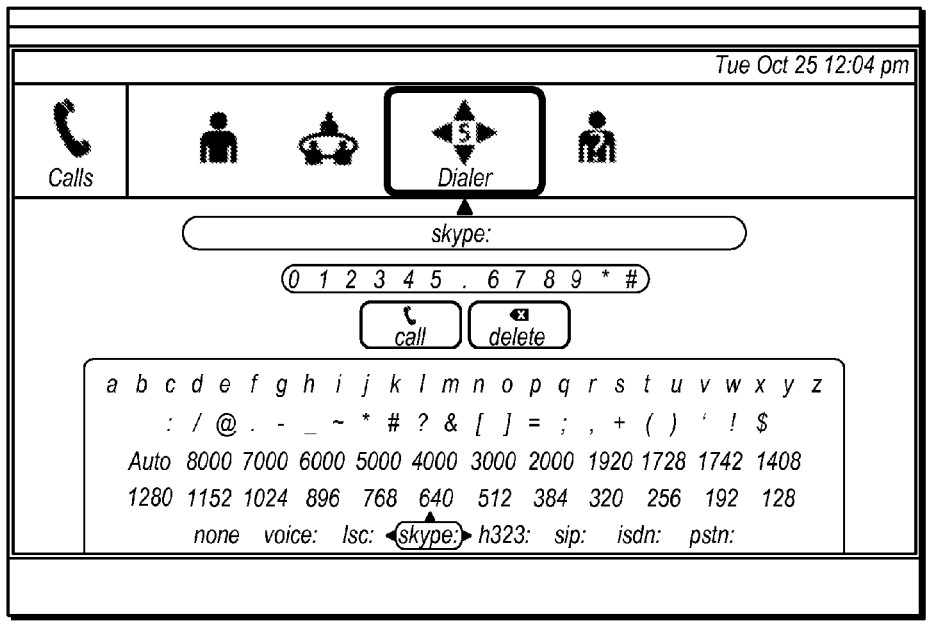

In FIG. 10C, the user has selected and confirmed the "skype:" element of the sixth row. Accordingly, "skype:" is shown in the dialer input field.

Figure 10D:
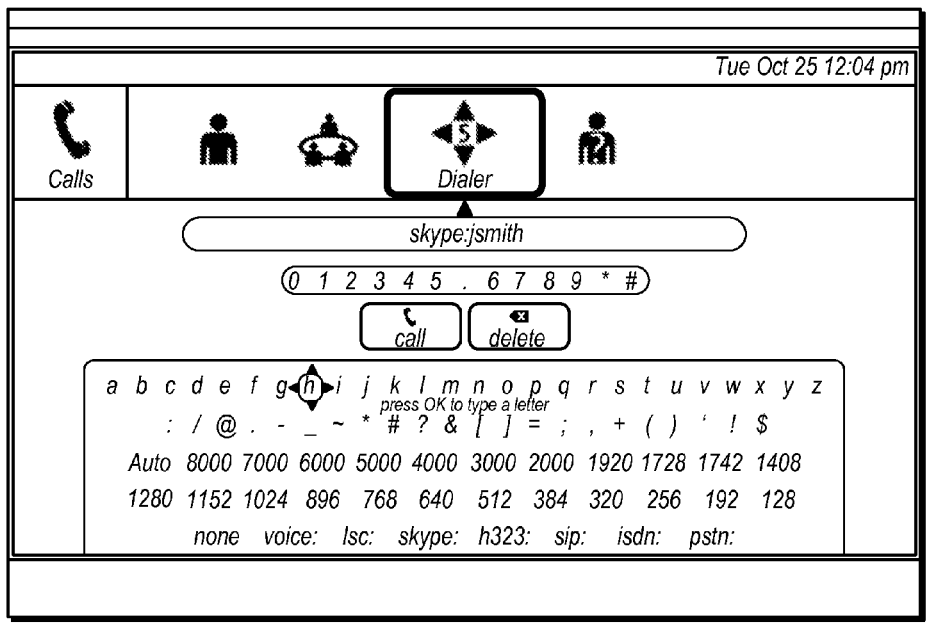

In FIG. 10D, the user has selected and confirmed the input "jsmith" via the second row. In this Figure, the letter "h" is currently selected.

Figure 10E:
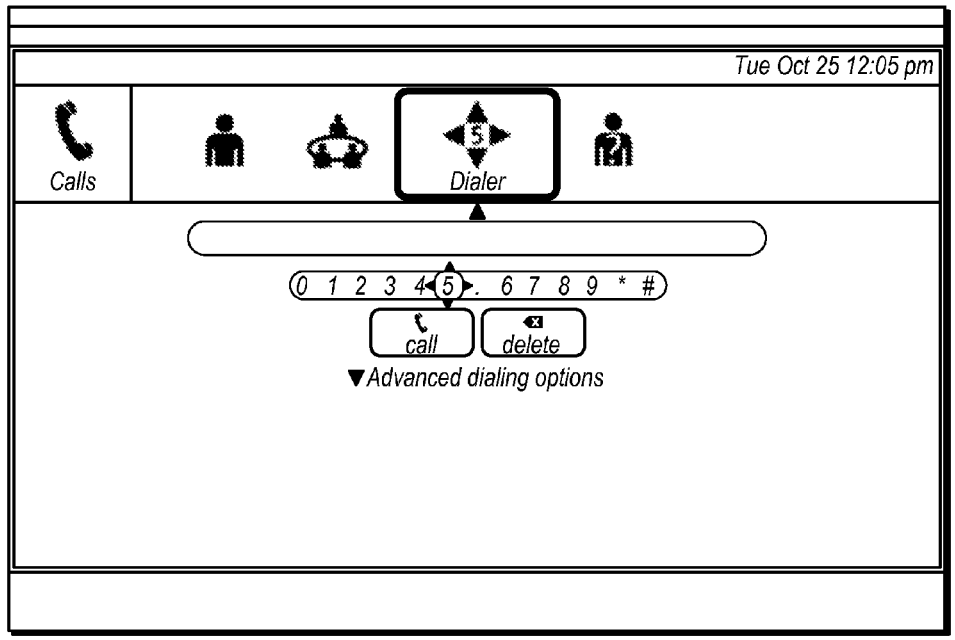

In FIG. 10E, the user has erased the "skype:jsmith" input and has returned to the first row, with the number "5" being currently selected.

Figure 10F:
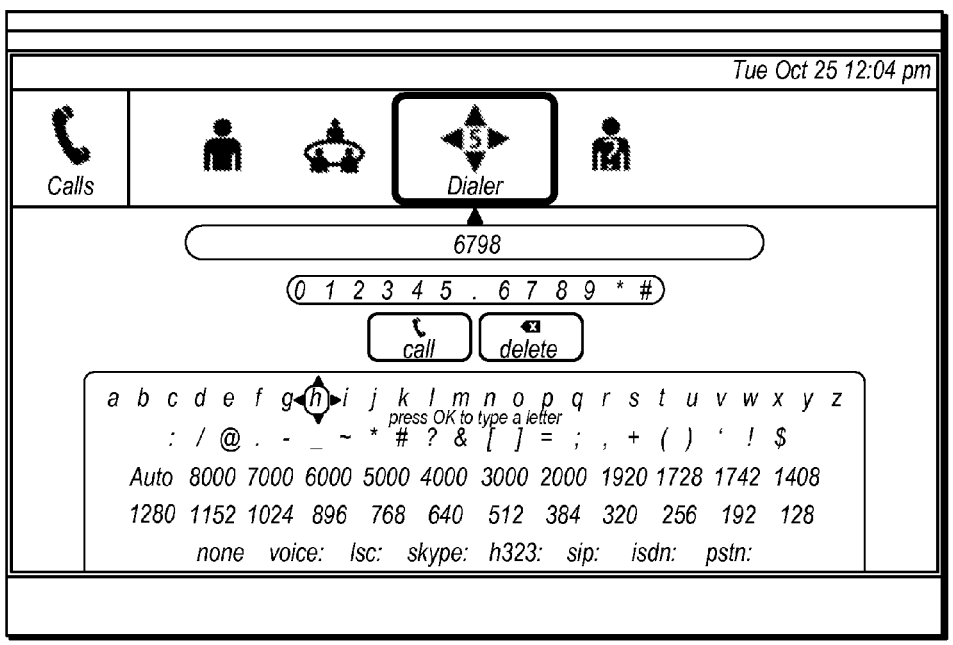

In FIG. 10F, the user has provided the input "6798" via the first row and returned to the second row. As shown, the letter "h" is currently selected since it was the last letter previously selected (as shown in FIG. 10D). Thus, instead of moving to the letter "a" as was the case in FIG. 10B, the selection item is shown for the letter "h" upon entering the second row since it was the last character selected.

Figure 10G:
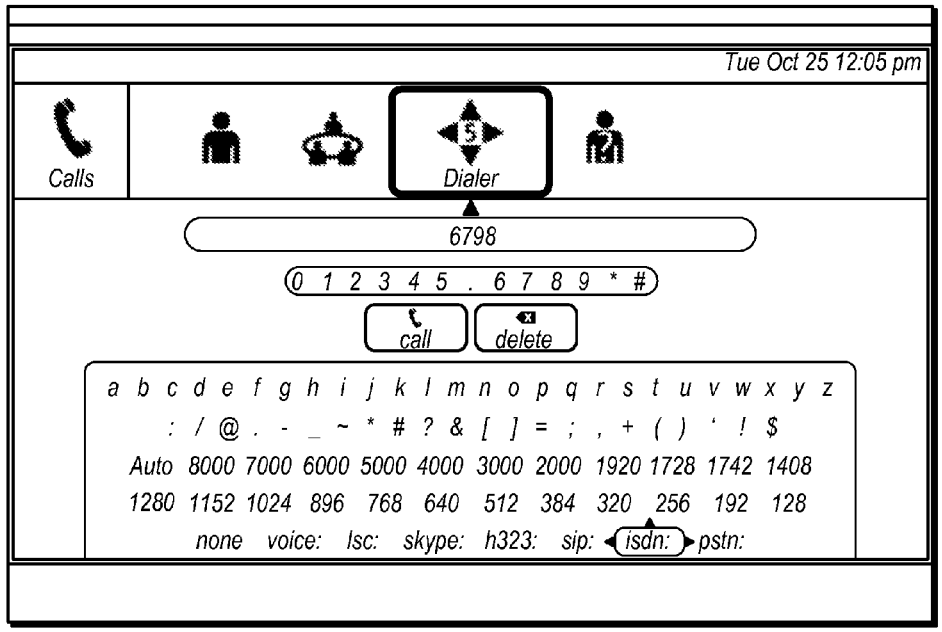

In FIG. 10G, the user has selected the protocol type "isdn:".

Figure 10H:
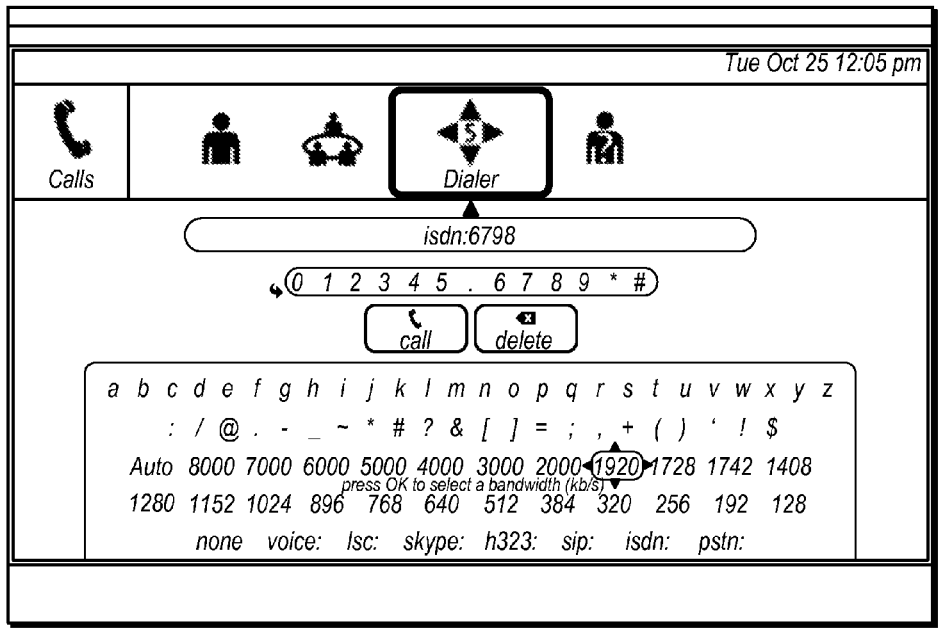

In FIG. 10H, the user has confirmed the "isdn:" protocol (making the input field "isdn:6798") and has selected the bandwidth "1920" kb/s from the fourth row.

Figure 10I:
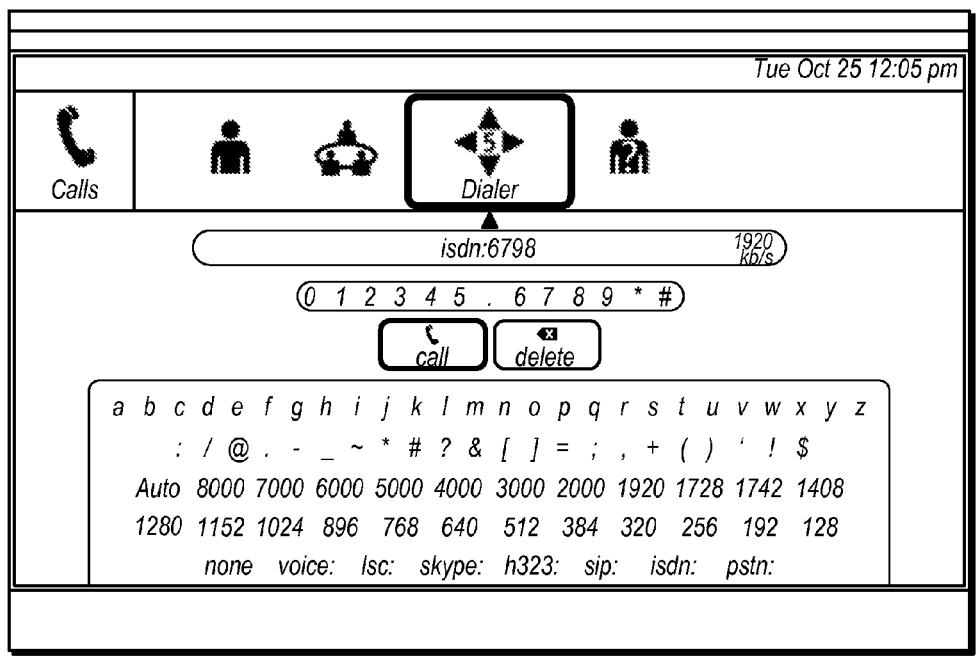

Finally, in FIG. 10I, the user has selected the "call" icon after specifying those elements for the call.

Figure 11:
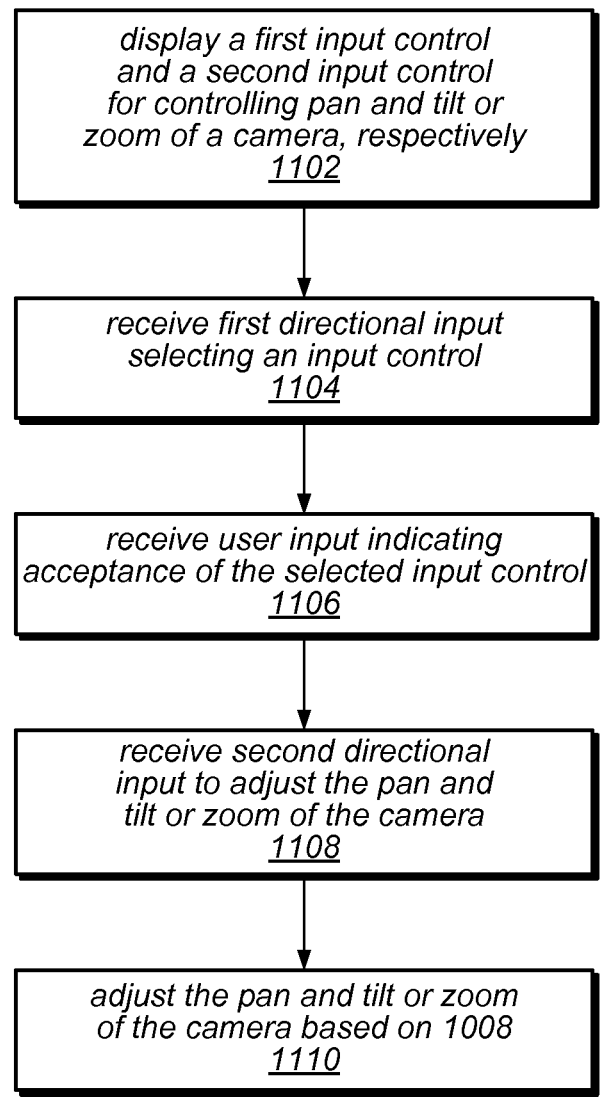
FIG. 11 is a flowchart diagram illustrating an embodiment of a method for controlling a camera using a remote control device.

FIG. 11—Controlling a Camera

FIG. 11 illustrates an embodiment of a method for providing a user interface for controlling a camera using a remote control device. The method shown in FIG. 11 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1102, a first input control and a second input control for controlling pan and tilt or zoom of a camera, respectively, may be displayed. More specifically, the first input control for controlling the pan of the camera may be displayed at a first location in the user interface (shown on the display) and the second input control for controlling the tilt or zoom of the camera may be displayed at a second location in the user interface.

In some embodiments, the first and second input controls may be displayed in response to selection of a camera. For example, the user may select a camera to control from a plurality of various cameras. Accordingly, in response to selection (e.g., and confirmation) of the camera, the first and second input controls may be displayed.

The first input control may be displayed as an icon in the user interface. Additionally, the icon may visually indicate that it may be used to control pan and tilt of the camera. For example, the icon may include a picture of a camera with arrows around it to indicate possible movement. Similarly, the second input control may be displayed as an icon in the user interface that visually indicates that it may be used to control the zoom of the camera. For example, the icon may include a picture of a magnifying glass, typically used to indicate zoom functionality.

In 1104, first directional input selecting an input control may be received. More specifically, in one embodiment, the user may use directional input in order to cause the selection item to select one of the input controls.

In 1106, user input indicating acceptance of the selected input control may be received. For example, after selection in 1104, the user may provide input confirming selection of the input control, e.g., via a confirmation input of the remote control device. Note that the user may be able to deselect one of these input controls by providing confirmation input.

In 1108, second directional input to adjust the camera may be received. More specifically, where the user has selected and confirmed the first input control, the second directional input may be received to control the pan or tilt of the camera. In one embodiment, left and right directional input may be used to control pan of the camera while up and down directional input may be used to control tilt of the camera.

Similarly, where the user has selected and confirmed the second input control, the second directional input may be received to control the zoom of the camera. In one embodiment, left and right directional input may be used to decrease and increase zoom, respectively. In a particular embodiment, vertical input may be used to change from controlling the zoom to controlling the pan and tilt of the camera, e.g., without having to deselect the second input control and select the first input control. This change in control may be displayed on the display by changing from displaying the selection item for the second input control to displaying the selection item for the first input control. Thus, in this embodiment, the user may be able to quickly switch from controlling the zoom of the camera to controlling the pan and tilt of the camera. Note that the reverse may not be possible since the first input control may utilize all directional input for controlling pan and tilt.

Note further that the particular direction of the input may be reversed, e.g., where vertical input is used to control zoom and the horizontal input is used to switch from the first control to the second control. Additionally, the direction input orthogonal to the control of the zoom may only work in the direction of the first input control relative to the second input control. For example, where the zoom is controlled using horizontal directional input and the first input control is displayed above the second input control, the switch from the first control to the second control may only occur when the up directional input is provided, although other embodiments are envisioned.

In 1110, the pan and tilt or zoom of the camera may be adjusted based on 1008. More specifically, signals may be provided to the camera to cause the camera to adjust its pan, tilt, or zoom, based on the input received in 1108.

Note that the method may further include displaying icons for different camera presets. The user may select these icons (e.g., using directional input) and confirm selection (e.g., by providing confirmation input). In response, the pan and tilt and/or zoom of the camera may be adjusted to the values represented by the camera presets.

FIGS. 12A-12H—Exemplary Interfaces Corresponding to FIG. 11

FIGS. 12A-12H are exemplary user interfaces which correspond to one embodiment of the method of FIG. 11. More specifically, these user interfaces correspond to an embodiment involving videoconferencing. These graphical user interfaces are provided as examples only and do not limit any of the embodiments described above.

Figure 12A:
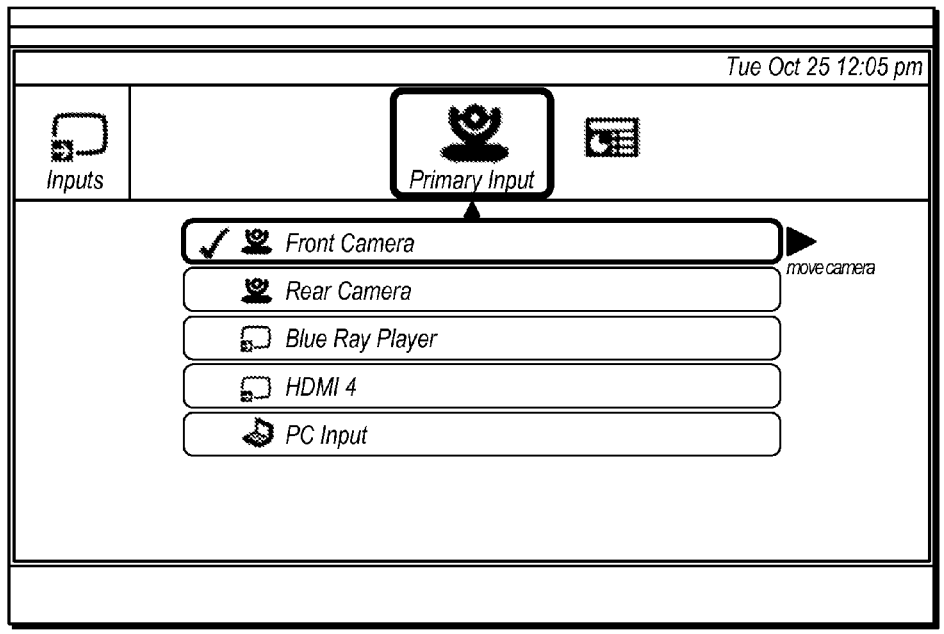
FIGS. 12A-12H illustrate exemplary interfaces corresponding to FIG. 11, according to one embodiment.

FIG. 12A illustrates an exemplary interface within the "inputs" submenu. As shown, the user has selected the "primary input" item and a list of possible inputs are displayed. In this particular example, the inputs are "front camera", "rear camera", "blue ray player", "HDMI 4", and "PC Input". The front camera item is currently displayed as being selected, as indicated by the "check" icon and the arrows surrounding the selection icon. By selecting the right directional input, the user may invoke input controls for controlling the front camera, as indicated by the right arrow icon.

Figure 12B:
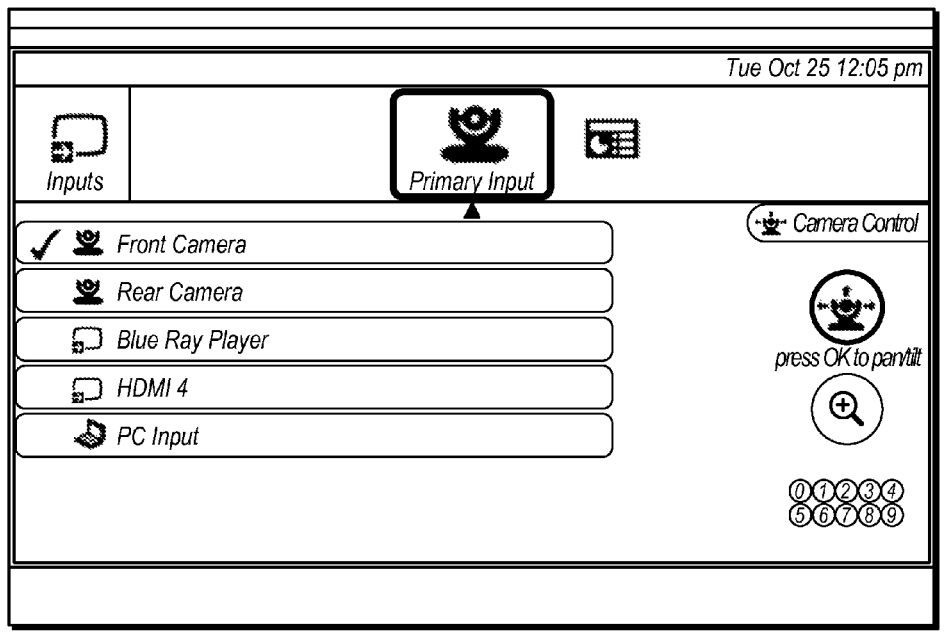

FIG. 12B illustrates the corresponding user interface for controlling the front camera. More specifically, the list of inputs has shifted to the left of the user interface and a camera control portion has appeared on the right. As shown, the input control for controlling the pan or tilt of the camera is currently selected. Accordingly, there is text underneath this portion, stating "press OK to pan/tilt". Below the pan/tilt control is a second input control for controlling zoom of the camera, as indicated by the magnifying glass icon. Finally, below that input control are several icons representing camera presets. More specifically, they are shown as numbers within circles that may be selected to move the camera to the corresponding camera preset.

Figure 12C:
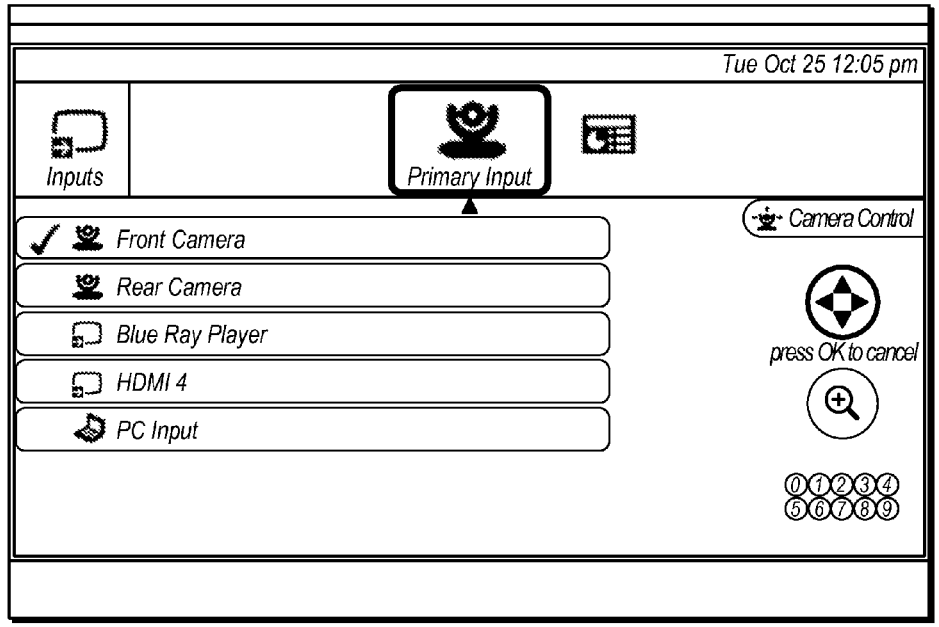

In FIG. 12C, the user has confirmed selection of the pan/tilt control. Accordingly, the icon has changed from a camera icon to a four directional arrows, indicating that the user may provide directional input to control the pan and tilt of the camera. As also shown, the text "press OK to cancel" is shown below the icon, indicating that the user may deselect the icon and release control of the pan and tilt of the camera by providing confirmation input (although other embodiments where a cancel input is used are envisioned).

Figure 12D:
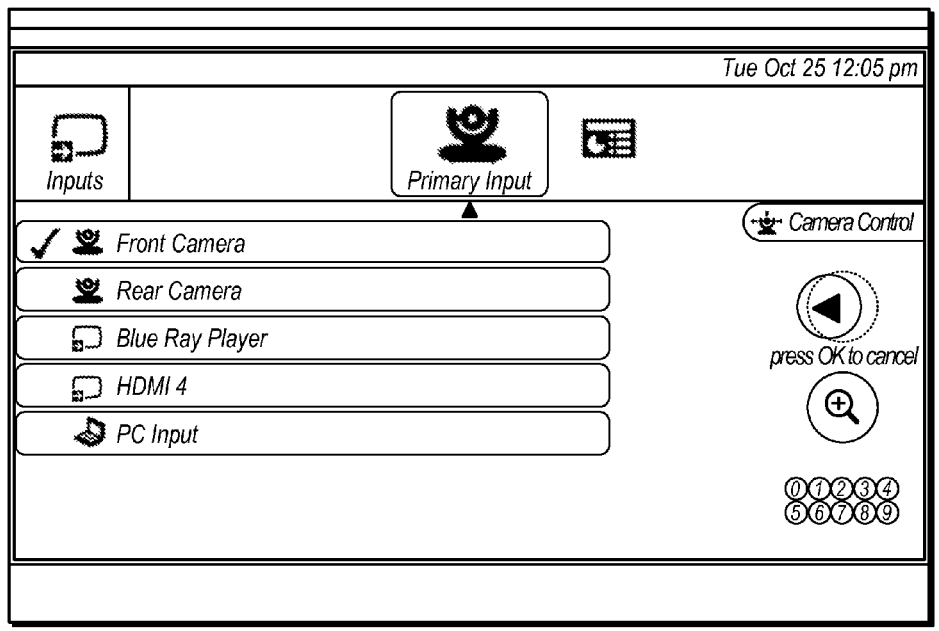

In FIG. 12D, the user has provided left directional input while controlling the pan and tilt of the camera. In response, the camera may pan left (or right, if inverted). Additionally, as shown in the user interface, an icon showing a left arrow is displayed over the original control and slightly offset to the left, providing a visual indication of the feedback the user is providing.

Figure 12E:
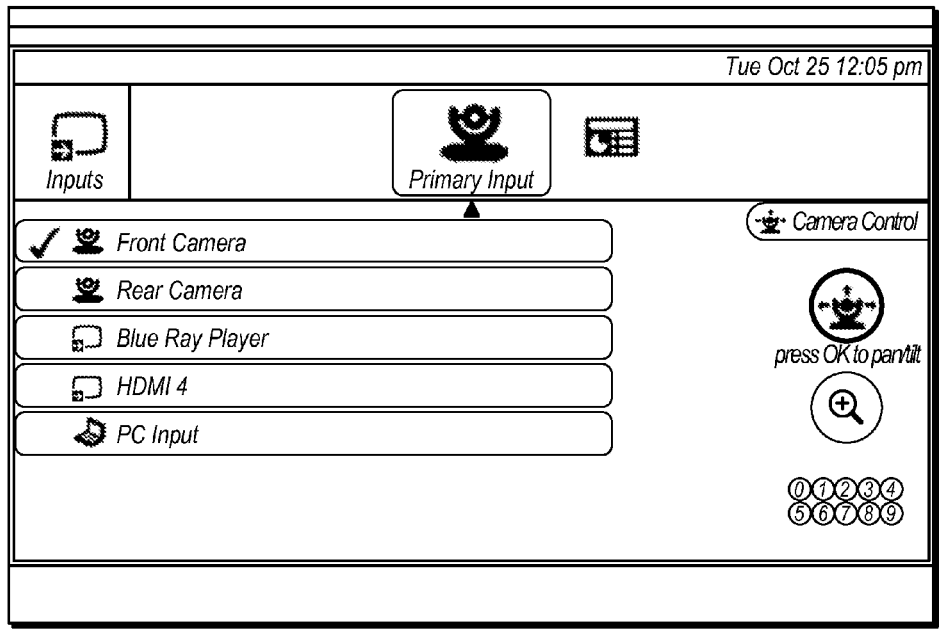

In FIG. 12E, the user has provided confirmation input to cease controlling the pan and tilt of the camera, returning to the state of FIG. 12B.

Figure 12F:
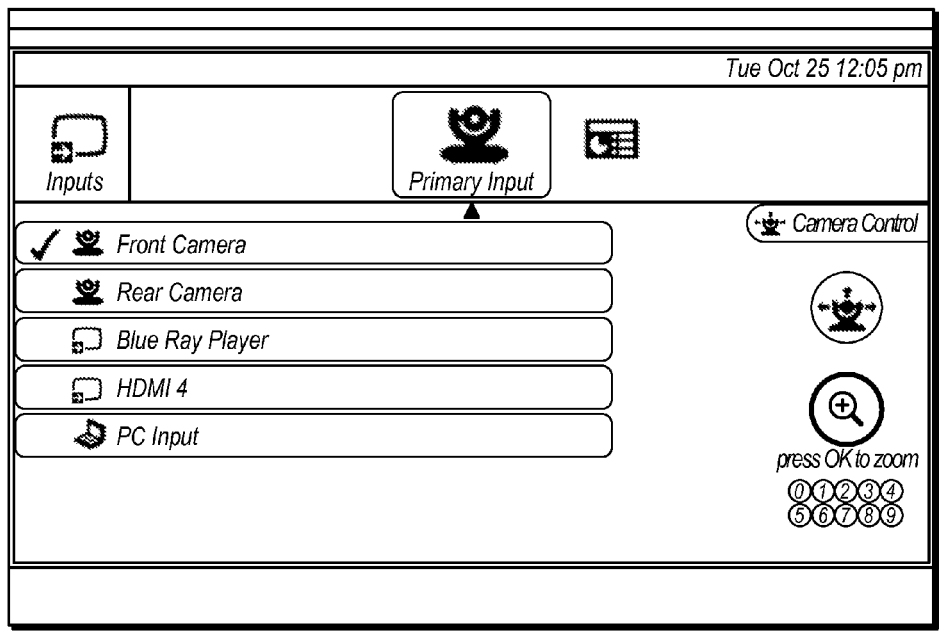

In FIG. 12F, the user has selected the zoom input control.

Figure 12G:
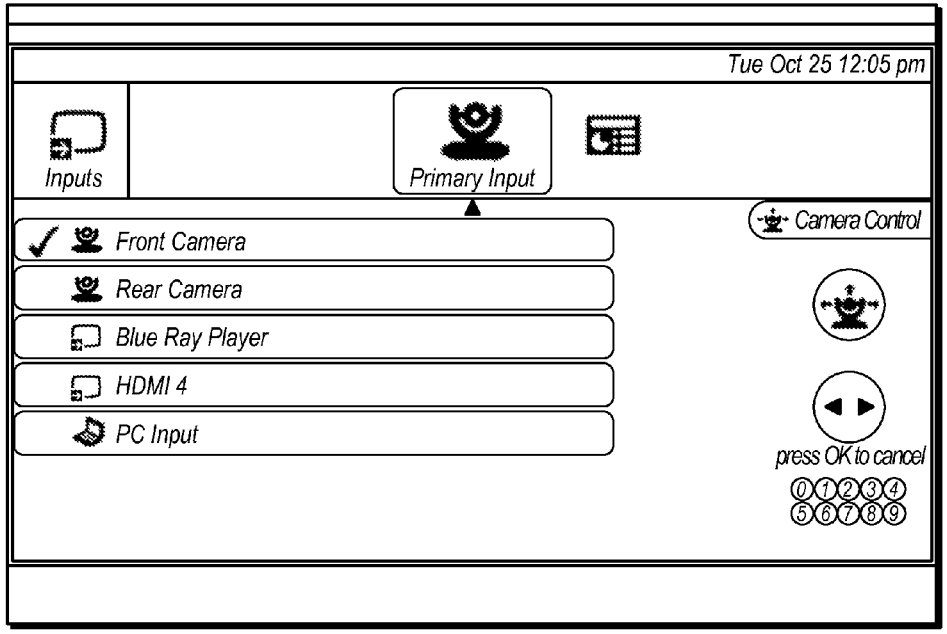

In FIG. 12G, the user has confirmed selection of the zoom input control. As visually indicated in the Figure, the user may provide left or right input to zoom in or out, respectively.

Figure 12H:
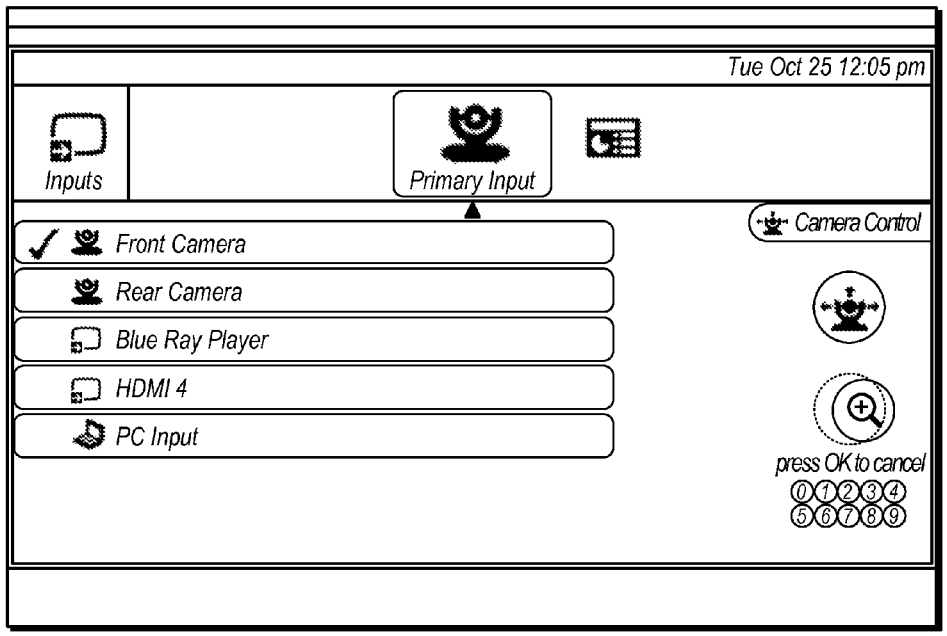

In FIG. 12H, the user has provided right directional input to zoom in. Accordingly, the interface indicates this visually by overlaying a "zoom in" icon that is offset to the right of the original icon.

The user may similarly control the "rear camera" following the same process. Additionally, presets may be used by selecting and confirming various ones of the camera preset icons.

Figure 13:
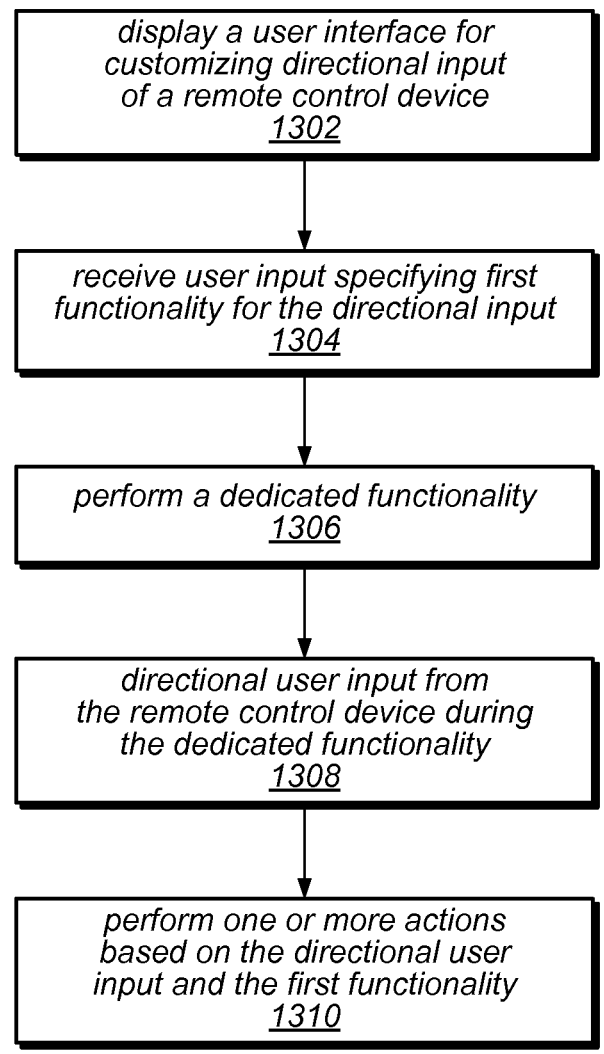
FIG. 13 is a flowchart diagram illustrating an embodiment of a method for customizing directional input of a remote control device.

FIG. 13—Customizing Directional Input of a Remote Control Device

FIG. 13 illustrates an embodiment of a method for providing a user interface for customizing directional input of a remote control device. The method shown in FIG. 13 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1302, a user interface for customizing directional input of a remote control device may be displayed. This user interface may be accessed in a variety of manners, e.g. using the interface described above, with respect to FIGS. 4-6F. In one embodiment, the user interface may include a plurality of presets for the directional input. For example, there may be an icon displayed for each different preset that may be selectable by the user. Alternatively, or additionally, the user interface may allow the user to select individual directional inputs (or any inputs) and then specify a desired action for that directional input, e.g., by selecting from a plurality of desired actions provided in the user interface. Some combination is also envisioned, e.g., where the user selects a preset and then modifies the preset, such as by changing the assigned actions for one or more of the inputs specified in the preset. The user may also be able to create new presets, e.g., by specifying new presets manually and/or by modifying an existing preset, as desired.

In 1304, user input specifying first functionality for the directional input may be received. Following the embodiments above, the user may select one of the presets for the directional input and/or specify desired actions for one or more of the inputs. This input may involve selection of a preset and then confirmation of the preset. Alternatively, the input may involve selection of a particular input, confirmation of that input, selection of a desired action for that input, and/or confirmation of that desired action. Thus, the user may specify the behavior for the directional inputs using the user interface. As discussed below, this behavior may only be invoked when the directional inputs are not needed for interaction, e.g., while dedicated functionality is being performed. In other words, when directional inputs are required (e.g., when interacting with a user interface that requires directional input, such as a menu system), they may function normally; however, when directional inputs are not required (e.g., while dedicated functionality is being performed), they may function according to the first functionality. Thus, the directional inputs may have a default functionality (providing directional input) in a first context and may have the first functionality in a different context. In some embodiments, this concept may be extended to any number of contexts. Thus, the user may specify first functionality for a first context, second functionality for a second context, etc.

The first functionality may be any desired functionality. For example, in the case of a videoconference, the functionality may involve assigning inputs for presentations, recording, layouts, volume, camera adjustments, etc. More specifically, for presentations, one or more of the directional inputs may be used to start, stop, navigate forward in the presentation, and/or navigate backward in the presentation. For recording, one or more of the directional inputs may be used to start and/or stop recording. For layouts, one or more of the directional inputs may be used for particular layout presets (e.g., continuous presence, various fixed layouts, voice activated switching, etc.). Alternatively, or additionally, one or more of the directional inputs may be used to navigate through a set of layouts (e.g., using left and right directional inputs for previous and next layouts). The directional inputs may also be used to increase or decrease volume. For camera control, one or more of the directional inputs may be used to activate a camera preset. Additionally, or alternatively, one or more of the directional inputs may be used to control pan, tilt, or zoom of the control. In further embodiments, the directional inputs may be used to show or hide picture in picture (PIP), caller ID, or other functions, as desired.

The following provides a few possible presets that may be used for videoconferencing (e.g., during the videoconference). In a first preset, up may be assigned for entering or exiting a presentation mode, down may be used to start or stop recording, and left and right may be used to perform layout changes (e.g., navigating a set of layouts and/or individually assigned presets). In a second preset, up and down may be assigned for increasing and decreasing volume, respectively, and left and right may be used to make changes to the videoconference layout. In a third preset, the directional inputs may be assigned to individual camera presets. In a fourth preset, the directional inputs may control pan and tilt of a desired camera (note that the user may choose which camera may be controlled, e.g., from near or far end cameras). Any desired combination of actions may be assigned to the directional inputs.

While the above has been described with respect to videoconferencing, it may also apply to any desired device or functionality. For example, in the case of a television, the directional inputs may be assigned to favorite channels, adjusting volume, invoking picture in picture, recording, etc. As one specific example, the up and down functionality may be used for channel switching (next and previous channels) and the left and right inputs may be used for controlling volume (or vice versa). Thus, in this example, the directional input may be used in their normal sense while navigating a menu (e.g., a channel selection menu), but may adapt this new functionality when the menu is not present (e.g., when presenting content for a particular channel or video source). Similar embodiments may apply to HTPCs, e.g., which execute application(s) for presenting audio/video content. Thus, this functionality is not limited to videoconferencing applications.

In 1306, a new context or state may be entered. For example, dedicated functionality may be performed. More specifically, in the case of a videoconferencing system, a videoconference may be performed. Similarly, in the case of a cable box or set top box, associated content may be displayed (e.g., as opposed to a menu system for selecting content). Thus, in 1306, a context may be invoked that does not require the directional inputs to be used to indicate directionality, thereby allowing the first functionality to be used instead. Generally, this context may be invoked when dedicated functionality is performed.

In some embodiments, some visual indication of the first functionality or simply that the first functionality will be performed may be provided on the display. For example, a graphic icon and/or text may be shown in a portion (e.g., a corner or other inconspicuous portion) of the display which may indicate the first functionality. In one embodiment, an icon for each specified function may be displayed in a location that corresponds to each direction (e.g., functionality for the up input may be shown above functionality for the down input, etc.). Alternatively, an icon or text may indicate that the directional input may perform other functionality, e.g., without specifying what that functionality is. For example, where the directional inputs are used to control a camera, an icon of a camera may be shown. Where the directional inputs control multiple different items or functions, icons for each controlled item or function may be displayed.

In 1308, directional user input from the remote control device may be received in the new context (e.g., while performing the dedicated functionality). Accordingly, in 1310, one or more actions may be performed based on the directional user input and the specified first functionality. For example, during the videoconference, left and right inputs may be used to select presets, and up and down inputs may be used to adjust volume, depending on the functionality specified in 1304. Where functionality for a plurality of different contexts is assigned, the method may involve determining the context and then performing the appropriate functionality based on the context.

FIGS. 14A-14F—Exemplary Interfaces Corresponding to FIG. 13

FIGS. 14A-14F are exemplary user interfaces which correspond to one embodiment of the method of FIG. 13. More specifically, these user interfaces correspond to an embodiment involving videoconferencing. These graphical user interfaces are provided as examples only and do not limit any of the embodiments described above.

Figure 14A:
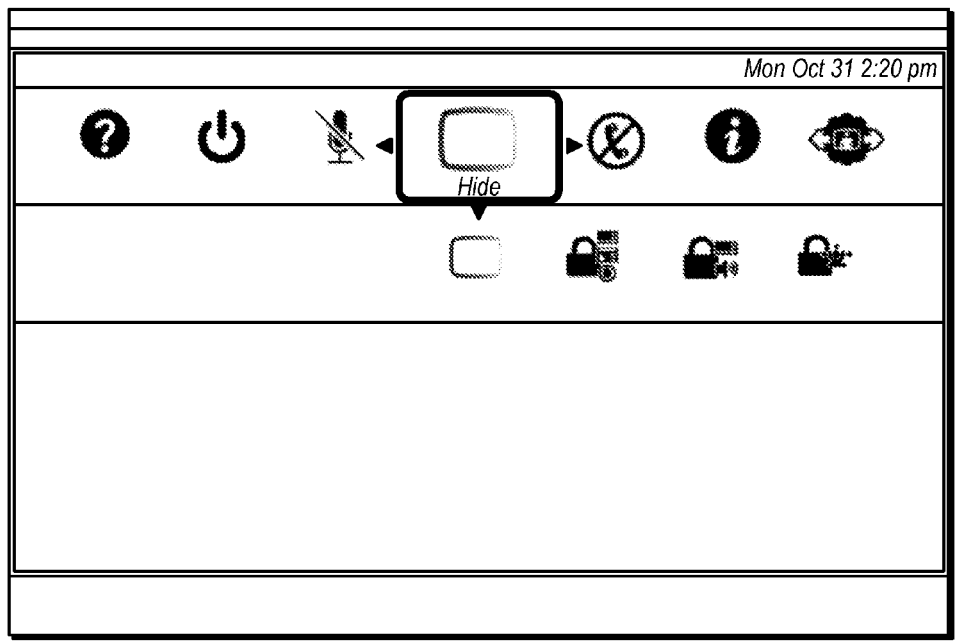
FIGS. 14A-14F illustrate exemplary interfaces corresponding to FIG. 13, according to one embodiment.

FIG. 14A illustrate an exemplary user interface where the user has selected the "hide" icon in the top level menu.

Figure 14B:
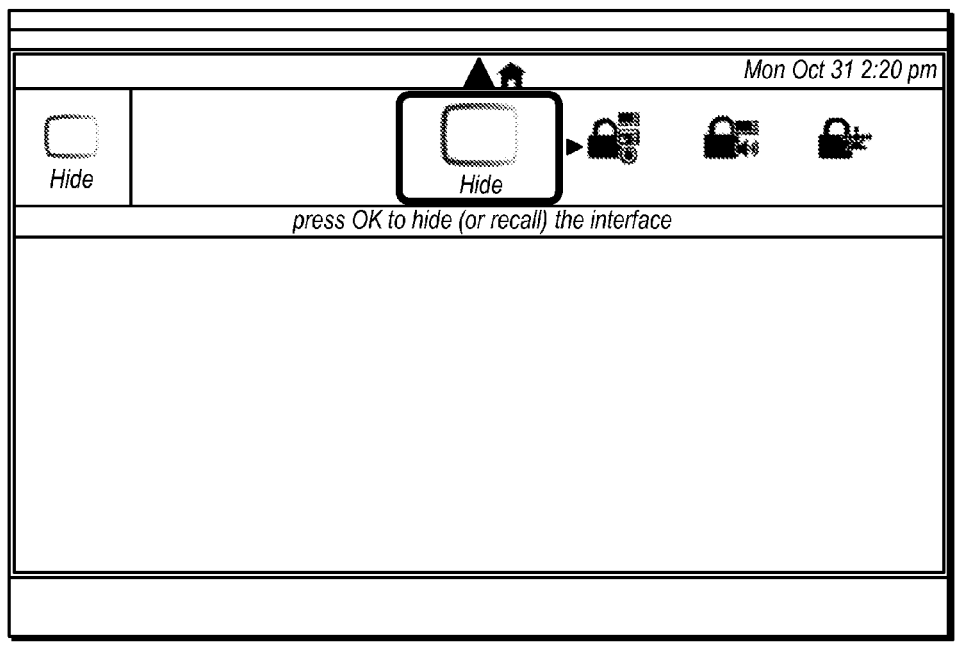

As shown in FIG. 14B, the user has entered the hide submenu. As indicated in the user interface, the user may "press OK to hide (or recall) the interface". To the right, various presets are shown for specifying extra functionality (e.g., overloaded functionality) of the remote control, e.g., for the directional inputs.

Figure 14C:
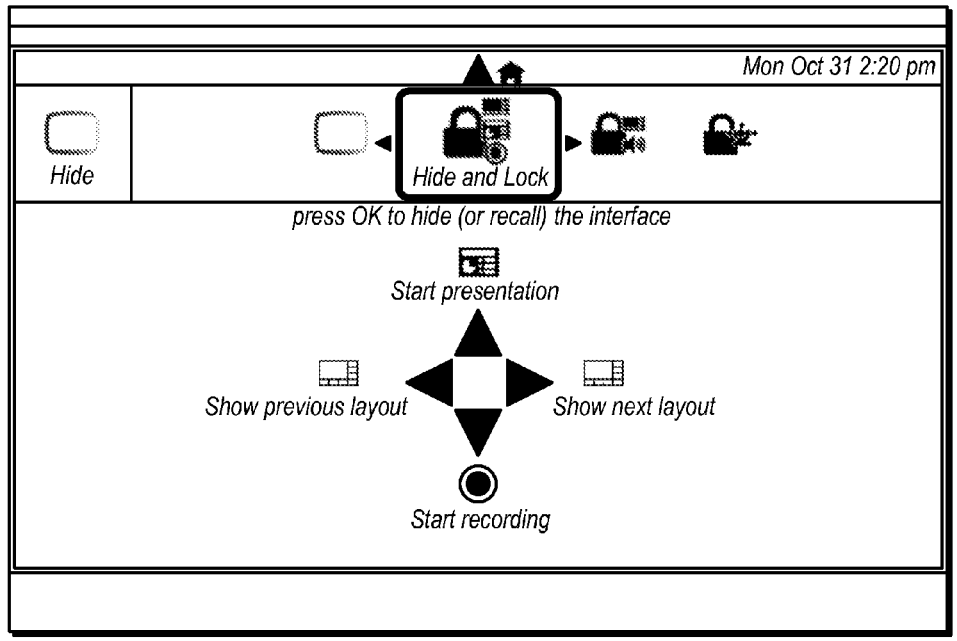

More specifically, in FIG. 14C, the user has selected an icon for hiding the menu and specifying (or "locking") functionality for the directional inputs. In this particular instance, the selected preset associates up directional input with beginning the presentation, down directional input with beginning recording, and left directional input and right directional input for invoking previous and next videoconferencing layouts, as indicated by the icons and text displayed in the user interface. As with the previous icon, the user may "press OK to hide (or recall) the interface". In this instance, confirming selection will both hide the menu and associate the visually indicated functionality with the directional inputs.

Figure 14D:
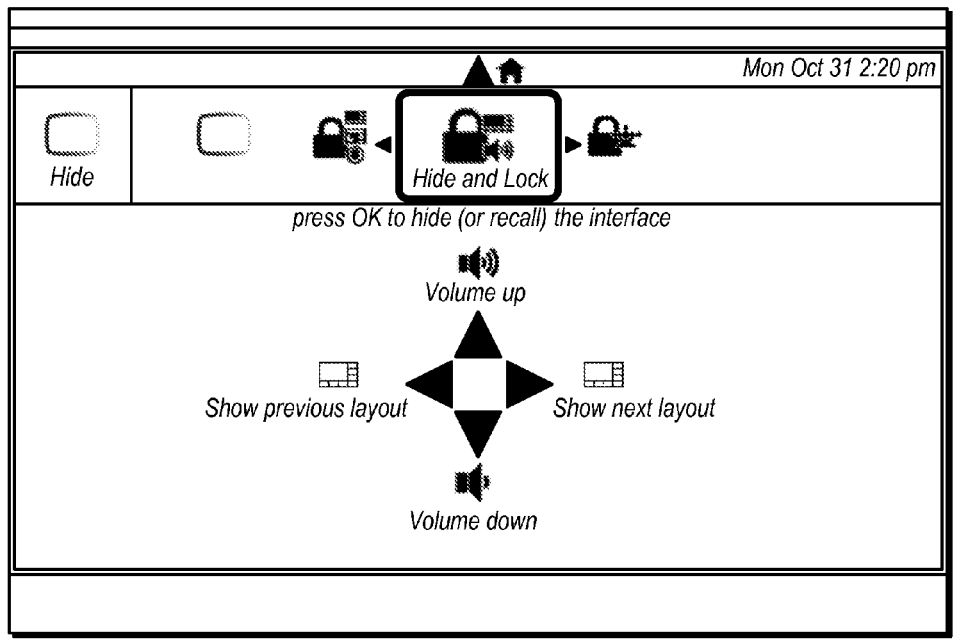

FIG. 14D illustrates another preset for directional input. In this preset, up directional input and down directional input are associated with increasing and decreasing volume, respectively, and left directional input and right directional input are associated with previous and next videoconferencing layouts, respectively.

Figure 14E:
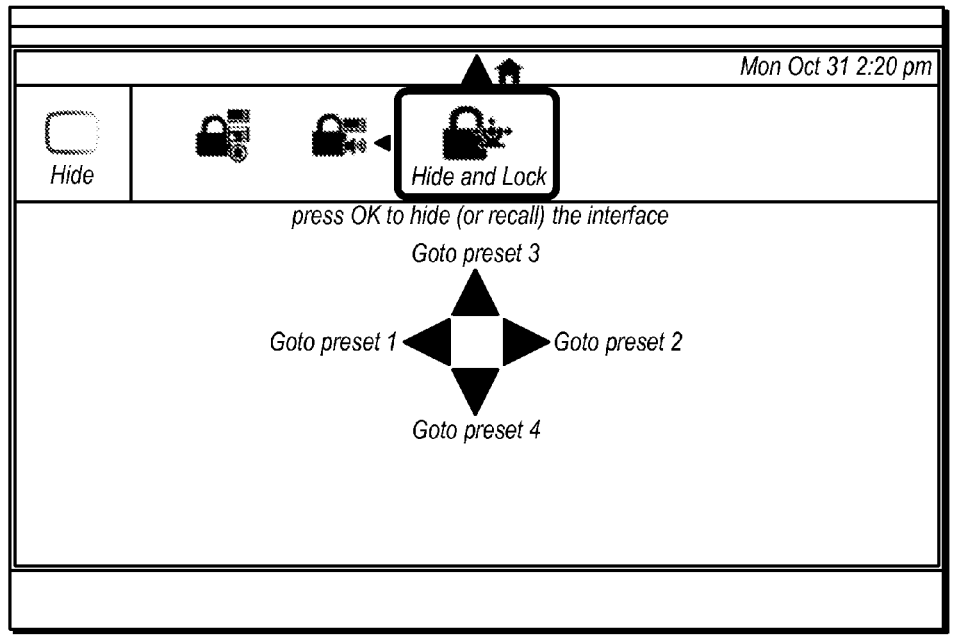

FIG. 14E illustrates another preset for directional input. In this preset, each of the directional inputs are associated with different camera presets.

Figure 14F:
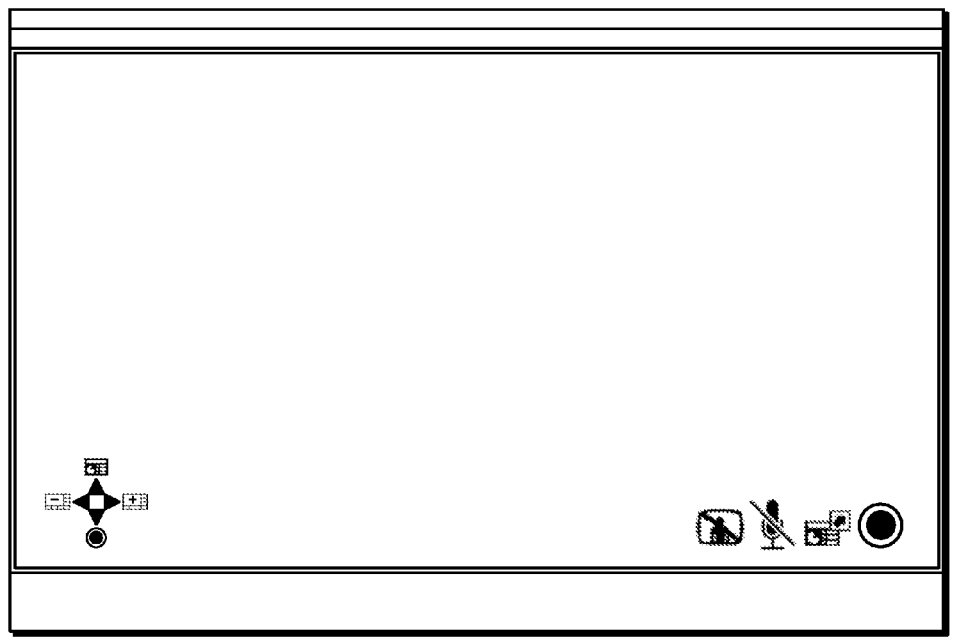

Finally, FIG. 14F illustrates a user interface once the user has selected the preset of FIG. 14C. In this interface, dedicated functionality may be displayed in the main portion of the display (e.g., videoconferencing content during a videoconference). On the bottom left of the interface, a key is shown indicating the current functionality of the directional input, in this case, icons representing the preset of FIG. 14C. In addition, on the bottom right, current status icons are shown. In this Figure, the videoconference is currently video and audio muted, a presentation is being shown, and the videoconference is being recorded.

Figure 15:
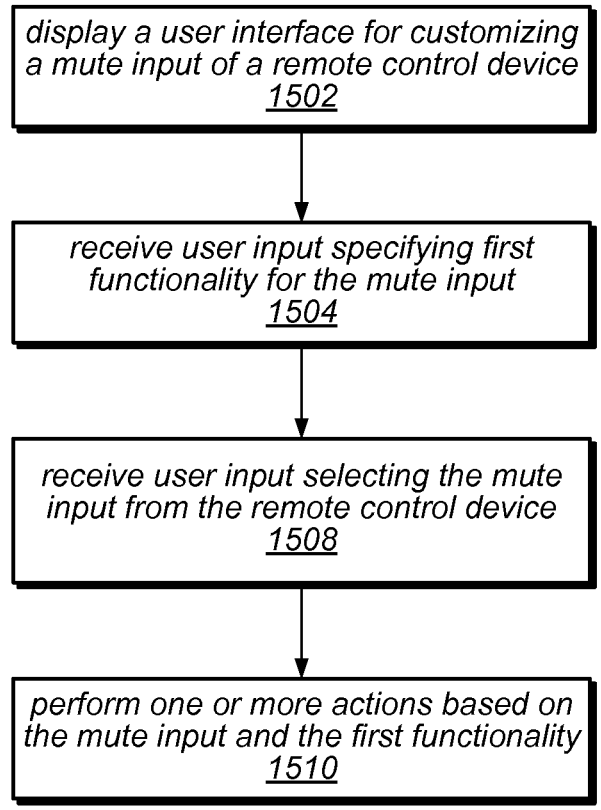
FIG. 15 is a flowchart diagram illustrating an embodiment of a method for customizing mute input of a remote control device.

FIG. 15—Customizing Mute Input of a Remote Control Device

FIG. 15 illustrates an embodiment of a method for providing a user interface for customizing a mute input of a remote control device. The method shown in FIG. 15 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1502, a user interface for customizing a mute input of a remote control device may be displayed. Similar to 1302 above, this user interface may be accessed in a variety of manners, e.g. using the interface described above, with respect to FIGS. 4-6F. In one embodiment, the user interface may include one or more presets for the mute input. For example, there may be an icon displayed for each different preset that may be selectable by the user. Alternatively, or additionally, the user interface may allow the user to select one or more actions to be performed when the mute input is selected. For example, the user may toggle one or more actions among a plurality of actions to be performed when the mute input is selected. Some combination is also envisioned, e.g., where the user selects a preset and then modifies the preset, such as by changing the assigned actions for the mute input. The user may also be able to create new presets, e.g., by specifying new presets manually and/or by modifying an existing preset, as desired.

In 1504, user input specifying first functionality for the mute input may be received. Following the embodiments above, similar to 1304, the user may select one of the presets for the mute input and/or specify desired actions for the mute input. This input may involve selection of a preset and then confirmation of the preset. Alternatively, the input may involve selection of a particular action, confirmation of that action, and/or further selections and confirmations, as desired. Thus, the user may specify the behavior for the mute input using the user interface.

The specified mute functionality may be used for all contexts (e.g., since the mute input may not provide any different functionality within a menu system). In other words, the functionality specified in 1504 may be invoked any time the mute input is provided, regardless of the context. However, in alternate embodiments, the mute input functionality may be context specific. For example, the mute functionality may have a default behavior in a first context (e.g., when a user interface is displayed) and the specified mute functionality may be used in a second context (e.g., when dedicated functionality is being performed and/or when a user interface or menu system is not presented). However, the mute input may be fully customizable, e.g., there may be no default functionality and/or the user may override that functionality. Similar to above, any number of contexts and functionality for those contexts may be received. For example, the user may specify first mute input functionality for a first context (e.g., within a menu), second mute input functionality for a second context (e.g., while dedicated functionality is being performed), etc.

In some embodiments, the specified functionality may only correspond to mute actions. For example, the specified functionality may include any combination of outgoing audio mute, outgoing video mute, incoming audio mute, and/or incoming video mute. As used herein, an "outgoing mute" (applying to both audio and video) refers to ceasing to provide audio and/or video to external systems. For example, an outgoing audio mute in a videoconference may result in a remote videoconferencing systems no longer receiving or providing audio from the local videoconferencing system for playback. Such a mute may be implemented by turning off local microphones, ceasing to provide audio to the remote videoconferencing systems, providing signals to the remote videoconferencing systems to cease playback of audio from the local videoconferencing system, etc. Similar descriptions apply to outgoing video mutes. Conversely, an "incoming mute" (applying to both audio and video) refers to ceasing to provide audio and/or video playback. For example, an incoming audio mute in a videoconference may result in all audio playback (e.g., from other videoconferencing systems) ceasing at the local videoconferencing location. Similarly, an incoming video mute in a videoconference may disable display of video at the local location (e.g., from remote videoconferencing systems). Note that incoming mutes may also apply to content provided locally (e.g., including audio or video, such as background music, provided by the local system).

However, in some embodiments, only a subset of the above options may be provided. For example, when using a system that only provides content from external sources (e.g., satellite or cable TV), outgoing mutes may not be applicable, so the available mute actions may only be incoming mutes (although they may be simply labeled "audio mute" and "video mute" rather than including the "incoming" portion). Even in contexts where incoming and outgoing mutes are possible, e.g., videoconferencing, it may be desirable to only show one or the other of types of mutes. For example, in audio or video conferencing, mutes are generally understood to be outgoing, so incoming mutes may not be shown for simplicity.

Note that the functionality may not be restricted to mute actions. For example, a user may be able to reassign the functionality of the mute input to another function. As a specific example, a user may wish to switch between two different channels (e.g., during commercials, such as when watching two sports games). Accordingly, the user may assign the mute input to switch to either of the channels. Additionally, the user may assign this functionality based on context. For example, the user may assign a particular set of mute functions (e.g., outgoing video and audio mute) as the functionality of the mute input while performing dedicated functionality, such as during a videoconference for a videoconferencing system. However, the user may assign a completely different function for the mute input (e.g., escaping menus) while in the context of a menu or user interface.

In addition, the user may be able to assign both mute actions and additional actions to the mute input. For example, the user may assign the mute input to perform an incoming audio mute and change the channel and pressing it again may undo the incoming audio mute and return to the current channel. Thus, the functionality of the mute input may be completely customizable. Similar to above, the user may also assign such mixed functionality based on contexts.

In 1506, user input selecting the mute input from the remote control device may be received. Accordingly, in 1508, one or more actions may be performed based on the mute input and the first functionality. Where functionality for a plurality of different contexts is assigned, the method may involve determining the context and then performing the appropriate functionality based on the context. For example, if the mute input is specified as performing incoming and outgoing audio and video mutes during a videoconference, but only performing incoming mutes while in a menu, the appropriate functionality may be performed based on the context.

Figure 16A:
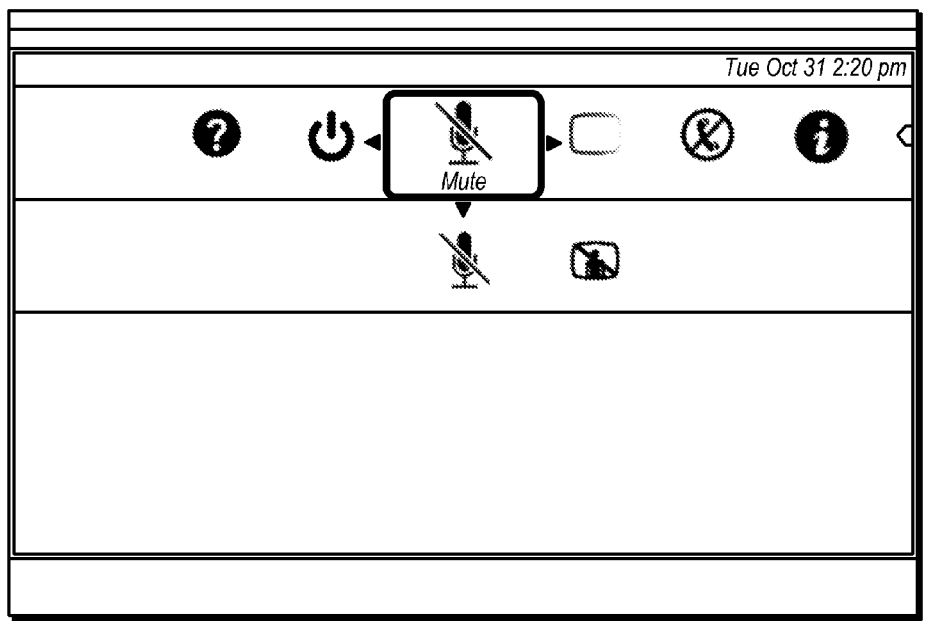
FIGS. 16A-16C illustrate exemplary interfaces corresponding to FIG. 15, according to one embodiment.
Figure 16B:
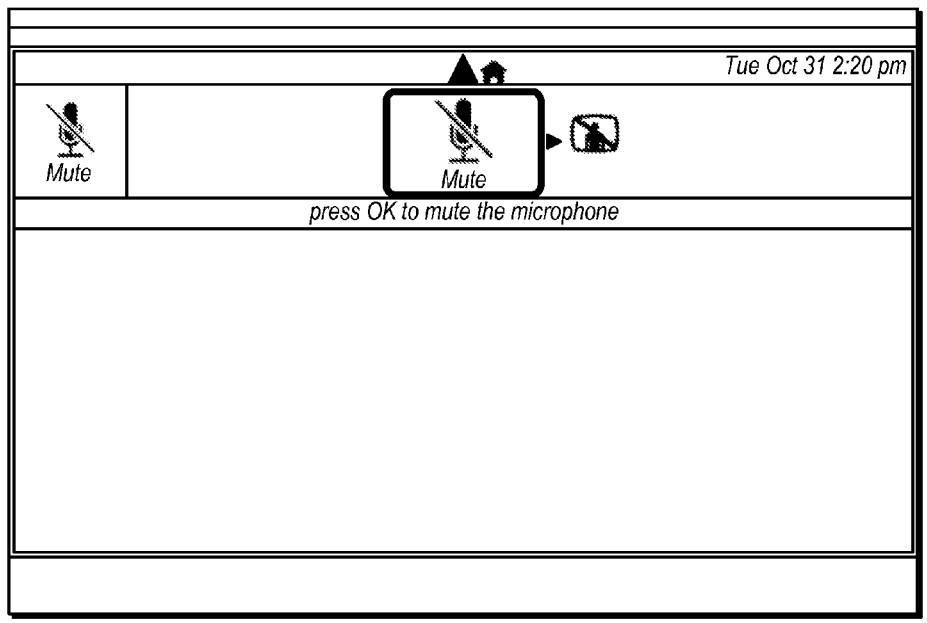
Figure 16C:
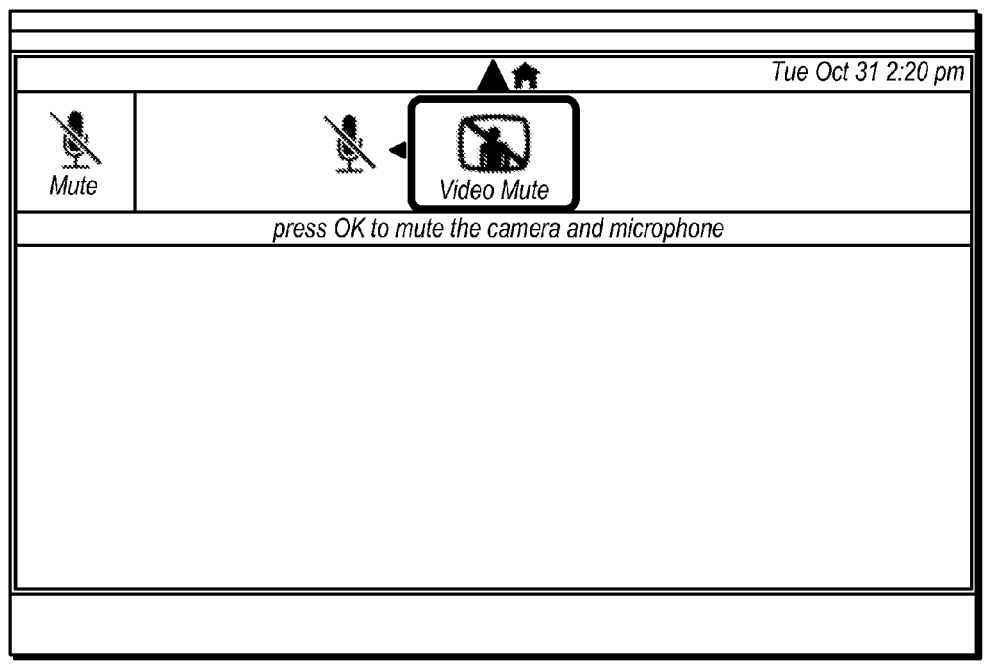

FIGS. 16A-16C—Exemplary Interfaces Corresponding to FIG. 15

FIGS. 16A-16C are exemplary user interfaces which correspond to one embodiment of the method of FIG. 15. More specifically, these user interfaces correspond to an embodiment involving videoconferencing. These graphical user interfaces are provided as examples only and do not limit any of the embodiments described above.

FIG. 16A illustrate an exemplary user interface where the user has selected the "mute" icon in the top level menu.

FIG. 16B illustrates an exemplary user interface where the user has entered the mute submenu. In this instance, the user has selected the audio mute, where the user may "press OK to mute the microphone" (representing an outgoing audio mute). In this particular embodiment, this mute is "sticky" such that pressing the mute input will result in performing or undoing the audio mute, depending on the current state (either on or off).

FIG. 16C illustrates an exemplary user interface where the user has selected the audio and video mute, where the user may "press OK to mute the camera and the microphone". Similar to above, this setting may apply to the functionality of the mute input, such that the audio and video is muted (or unmuted) when the mute input is provided, e.g., until the user changes the setting again.

As described above, further videoconferencing actions (e.g., including additional mute actions) may be specified in such a user interface.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for customizing user input to a videoconference, the method comprising:
    displaying a user interface for customizing directional input of a remote control device for use during a videoconference, wherein the user interface comprises a plurality of different videoconferencing actions that are assignable to one or more directional inputs of the remote control device in addition to normal functionality of the one or more directional inputs;
    receiving first user input specifying a first videoconferencing action of the plurality of different videoconferencing actions for a first directional input of the remote control device, wherein the user input is received, at least in part, using the directional input of the remote control;
    receiving second user input selecting the first directional input within a first context;
    performing normal behavior of the directional input based on the second user input being received within the first context;
    performing a videoconference with one or more videoconferencing units;
    receiving third user input selecting the first directional input during the videoconference having a second context;
    performing the first videoconferencing action in the videoconference instead of the normal behavior of the directional input based on the third user input being received within the second context.

2. The method of claim 1, wherein the user interface comprises a plurality of presets for the directional input corresponding to the plurality of different videoconferencing actions, wherein said receiving user input specifying the first videoconferencing action comprises selecting a first preset from the plurality of presets corresponding to the first videoconferencing action.

3. The method of claim 1, wherein said receiving the first user input comprises:
    receiving user input specifying a videoconferencing action for each directional input.

4. The method of claim 1, wherein the first videoconferencing action comprises:
    changing a layout of the videoconference.

5. The method of claim 1, wherein the first videoconferencing action comprises:
    changing a volume of the videoconference.

6. The method of claim 1, wherein the first videoconferencing action comprises:
    initiating recording of the videoconference.

7. The method of claim 1, wherein the first videoconferencing action comprises:
    changing a camera preset of the videoconference.

8. The method of claim 1, wherein the first videoconferencing action comprises:
    a presentation function of the videoconference.

9. The method of claim 1, wherein the remote control is a simple remote control, comprising:
    directional inputs for up, down, left, and right; and
    confirmation input for confirming a selection;
    wherein said receiving the user input only utilizes the directional inputs and the confirmation input.

10. The method of claim 1, wherein the remote control is a simple remote control, wherein the simple remote control comprises no more than 8 inputs.

11. A non-transitory, computer accessible memory medium storing program instructions for customizing user input to a videoconference, wherein the program instructions are executable to:
    display a user interface for customizing directional input of a remote control device for use during a videoconference, wherein the user interface comprises a plurality of different videoconferencing actions that are assignable to one or more directional inputs of the remote control device in addition to normal functionality of the one or more directional inputs;
    receive first user input specifying a first videoconferencing action of the plurality of different videoconferencing actions for a first directional input of the remote control device, wherein the user input is received, at least in part, using the directional input of the remote control;
    receive second user input selecting the first directional input within a first context;
    perform normal behavior of the directional input based on the second user input being received within the first context;
    perform a videoconference with one or more videoconferencing units;
    receive third user input selecting the first directional input during the videoconference having a second context;
    perform the first videoconferencing action in the videoconference instead of the normal behavior of the directional input based on the third user input being received within the second context.

12. The non-transitory, computer accessible memory medium of claim 11, wherein the user interface comprises a plurality of presets for the directional input corresponding to the plurality of different videoconferencing actions, wherein said receiving user input specifying the first videoconferencing action comprises selecting a first preset from the plurality of presets corresponding to the first videoconferencing action.

13. The non-transitory, computer accessible memory medium of claim 11, wherein said receiving the first user input comprises:
    receiving user input specifying a videoconferencing action for each directional input.

14. The non-transitory, computer accessible memory medium of claim 11, wherein the first videoconferencing action comprises:
    changing a layout of the videoconference.

15. The non-transitory, computer accessible memory medium of claim 11, wherein the first videoconferencing action comprises:
    changing a volume of the videoconference.

16. The non-transitory, computer accessible memory medium of claim 11, wherein the first videoconferencing action comprises:
    initiating recording of the videoconference.

17. The non-transitory, computer accessible memory medium of claim 11, wherein the first videoconferencing action comprises:
    changing a camera preset of the videoconference.

18. The non-transitory, computer accessible memory medium of claim 11, wherein the first videoconferencing action comprises:
    a presentation function of the videoconference.

19. The non-transitory, computer accessible memory medium of claim 11, wherein the remote control is a simple remote control, comprising:
   directional inputs for up, down, left, and right; and
   confirmation input for confirming a selection;
   wherein said receiving the user input only utilizes the directional inputs and the confirmation input.

20. The non-transitory, computer accessible memory medium of claim 11, wherein the remote control is a simple remote control, wherein the simple remote control comprises no more than 8 inputs.

* * * * *